United States Patent
Hwang et al.

(10) Patent No.: US 10,932,245 B2
(45) Date of Patent: Feb. 23, 2021

(54) RECEPTION OF MULTIPLE PDSCHS SIMULTANEOUSLY

(71) Applicant: Mediatek Inc., Hsin-Chu (TW)

(72) Inventors: Chien Hwa Hwang, Hsinchu (TW); Pei-Kai Liao, Hsinchu (TW); Wei-De Wu, Hsinchu (TW); Yen Shuo Chang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 102 days.

(21) Appl. No.: 16/272,055

(22) Filed: Feb. 11, 2019

(65) Prior Publication Data
US 2019/0254009 A1 Aug. 15, 2019

Related U.S. Application Data

(60) Provisional application No. 62/630,799, filed on Feb. 14, 2018.

(51) Int. Cl.
| H04W 72/04 | (2009.01) |
| H04W 76/11 | (2018.01) |
| H04W 72/12 | (2009.01) |
| H04W 4/06 | (2009.01) |
| H04W 72/10 | (2009.01) |

(52) U.S. Cl.
CPC .......... *H04W 72/042* (2013.01); *H04W 4/06* (2013.01); *H04W 72/0446* (2013.01); *H04W 72/0453* (2013.01); *H04W 72/10* (2013.01); *H04W 72/1205* (2013.01); *H04W 76/11* (2018.02)

(58) Field of Classification Search
None
See application file for complete search history.

(56) References Cited

U.S. PATENT DOCUMENTS

2019/0229878 A1* 7/2019 Takeda .................. H04W 72/02

FOREIGN PATENT DOCUMENTS

| CN | 102752874 A | 10/2012 |
| CN | 103959877 A | 7/2014 |
| CN | 107396394 A | 11/2017 |
| WO | 2017196245 A1 | 11/2017 |

OTHER PUBLICATIONS

International Search Report of PCT/CN2019/074941, dated May 8, 2019.

\* cited by examiner

*Primary Examiner* — Ajit Patel
*Assistant Examiner* — Pamit Kaur
(74) *Attorney, Agent, or Firm* — Locke Lord LLP; Tim Tingkang Xia, Esq.

(57) ABSTRACT

A method of wireless communication of a UE is provided. The UE determines resources of a first PDSCH and resources of second at least one PDSCH on a cell, the first PDSCH being a unicast PDSCH specific to the UE. The UE determines that the first PDSCH overlaps with the second at least one PDSCH in a time domain. The UE determines whether the second at least one PDSCH is another unicast PDSCH specific to the UE. When the second at least one PDSCH is not another unicast PDSCH specific to the UE, a duration required for decoding the first PDSCH meets a duration threshold, and the cell is in a first frequency range, the UE (a) refrains from decoding the first PDSCH independently of a transport block size of the second at least one PDSCH or (b) determines a transport block size of the second at least one PDSCH.

20 Claims, 20 Drawing Sheets

RECEPTION OF MULTIPLE PDSCHS SIMULTANEOUSLY

CROSS-REFERENCE TO RELATED APPLICATION(S)

This application claims the benefits of U.S. Provisional Application Ser. No. 62/630,799, entitled "RECEPTION OF MULTIPLE PDSCHS SIMULTANEOUSLY" and filed on Feb. 14, 2018, which is expressly incorporated by reference herein in their entirety.

BACKGROUND

Field

The present disclosure relates generally to communication systems, and more particularly, to techniques of managing simultaneous reception of multiple physical downlink shared channels (PDSCHs) at a user equipment (UE).

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE determines resources of a first physical downlink shared channel (PDSCH) and resources of second at least one PDSCH on a cell, the first PDSCH being a unicast PDSCH specific to the UE. The UE determines that the first PDSCH overlaps with the second at least one PDSCH in a time domain. The UE determines whether the second at least one PDSCH is another unicast PDSCH specific to the UE. When the second at least one PDSCH is not another unicast PDSCH specific to the UE, a duration required for decoding the first PDSCH meets a duration threshold, and the cell is in a first frequency range, the UE (a) refrains from decoding the first PDSCH independently of a transport block size of the second at least one PDSCH or (b) determines a transport block size of the second at least one PDSCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
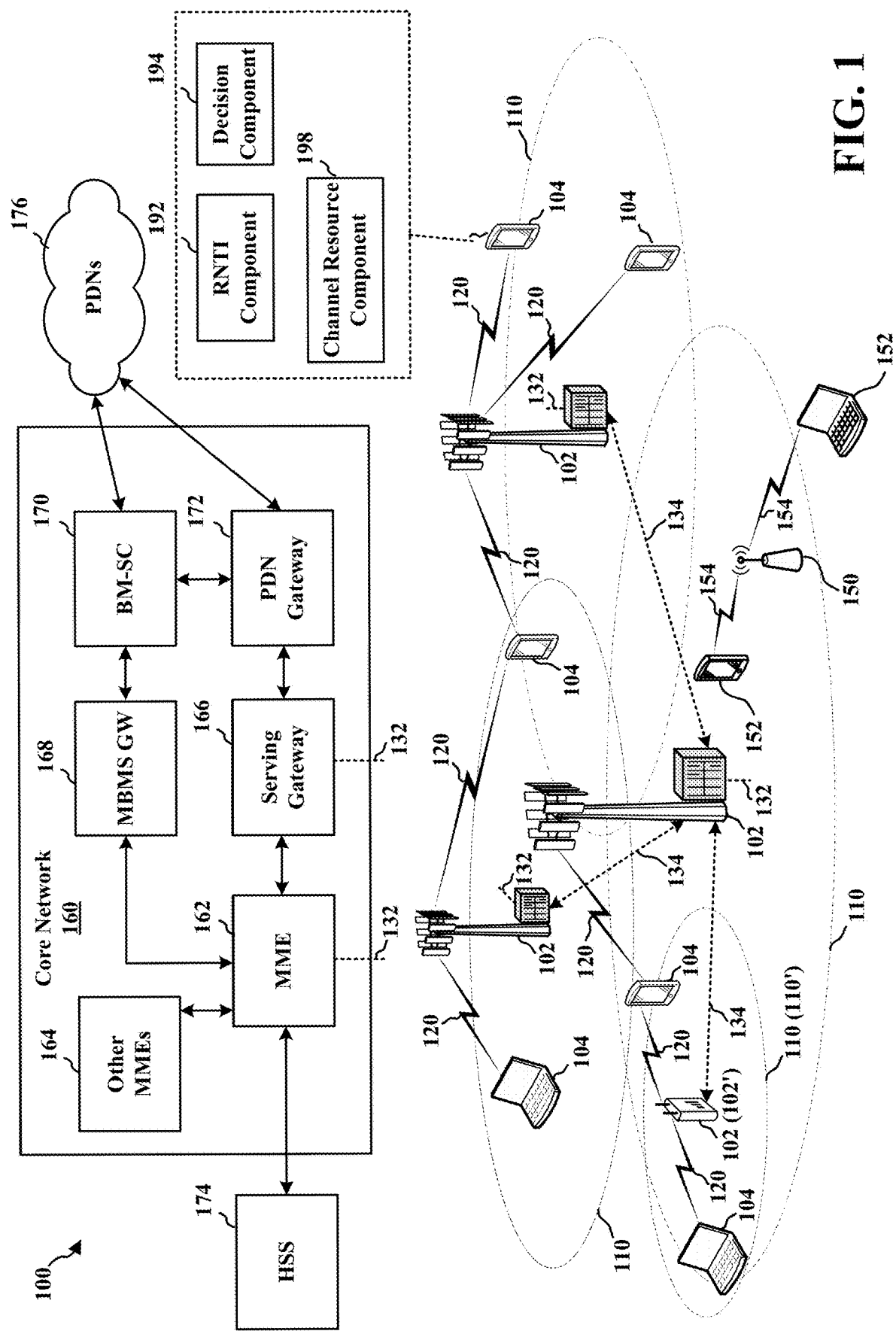
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and a core network 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the core network 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the core network 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The core network 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the core network 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the core network 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain aspects, the UE 104 includes, among other components, a RNTI component 192, a decision component 194, and a channel resource component 198. The channel resource component 198 determines resources of a first physical downlink shared channel (PDSCH) and resources of second at least one PDSCH on a cell, the first PDSCH being a unicast PDSCH specific to the UE. The decision component 194 determines that the first PDSCH overlaps with the second at least one PDSCH in a time domain. The decision component 194 determines whether the second at least one PDSCH is another unicast PDSCH specific to the UE. When the second at least one PDSCH is not another unicast PDSCH specific to the UE, a duration required for decoding the first PDSCH meets a duration threshold, and the cell is in a first frequency range, (a) the decision component 194 refrains from decoding the first PDSCH independently of a transport block size of the second at least one PDSCH or (b) the channel resource component 198 determines a transport block size of the second at least one PDSCH.

Figure 2:
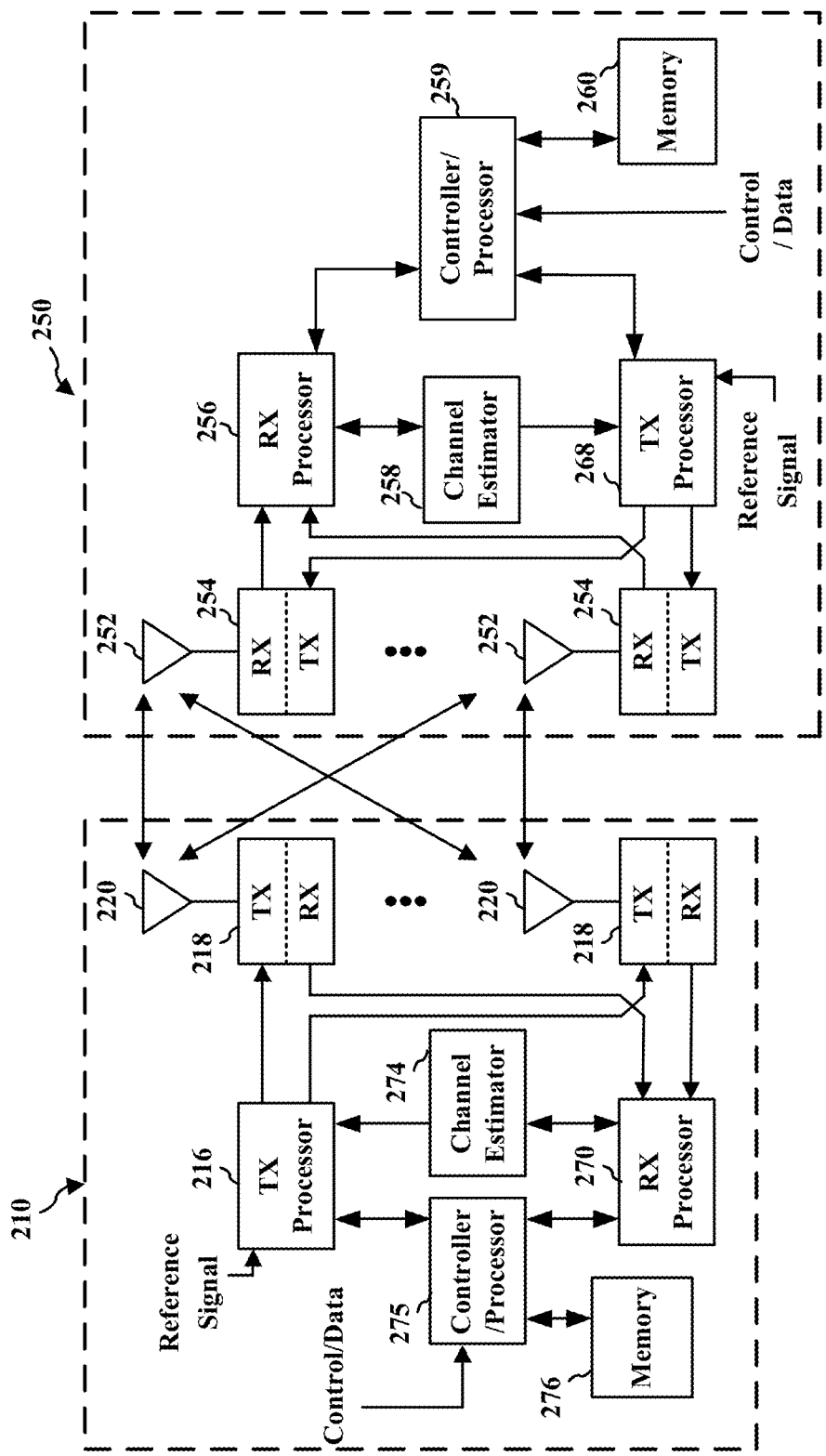
FIG. 2 is a diagram illustrating a base station in communication with a UE in an access network.

FIG. 2 is a block diagram of a base station 210 in communication with a UE 250 in an access network. In the DL, IP packets from the core network 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the core network 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the core network 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g., 80 MHz beyond), millimeter wave (mmW) targeting high carrier frequency (e.g., 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 60 kHz over a 0.125 ms duration or a bandwidth of 15 kHz over a 0.5 ms duration. Each radio frame may consist of 20 or 80 subframes (or NR slots) with a length of 10 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
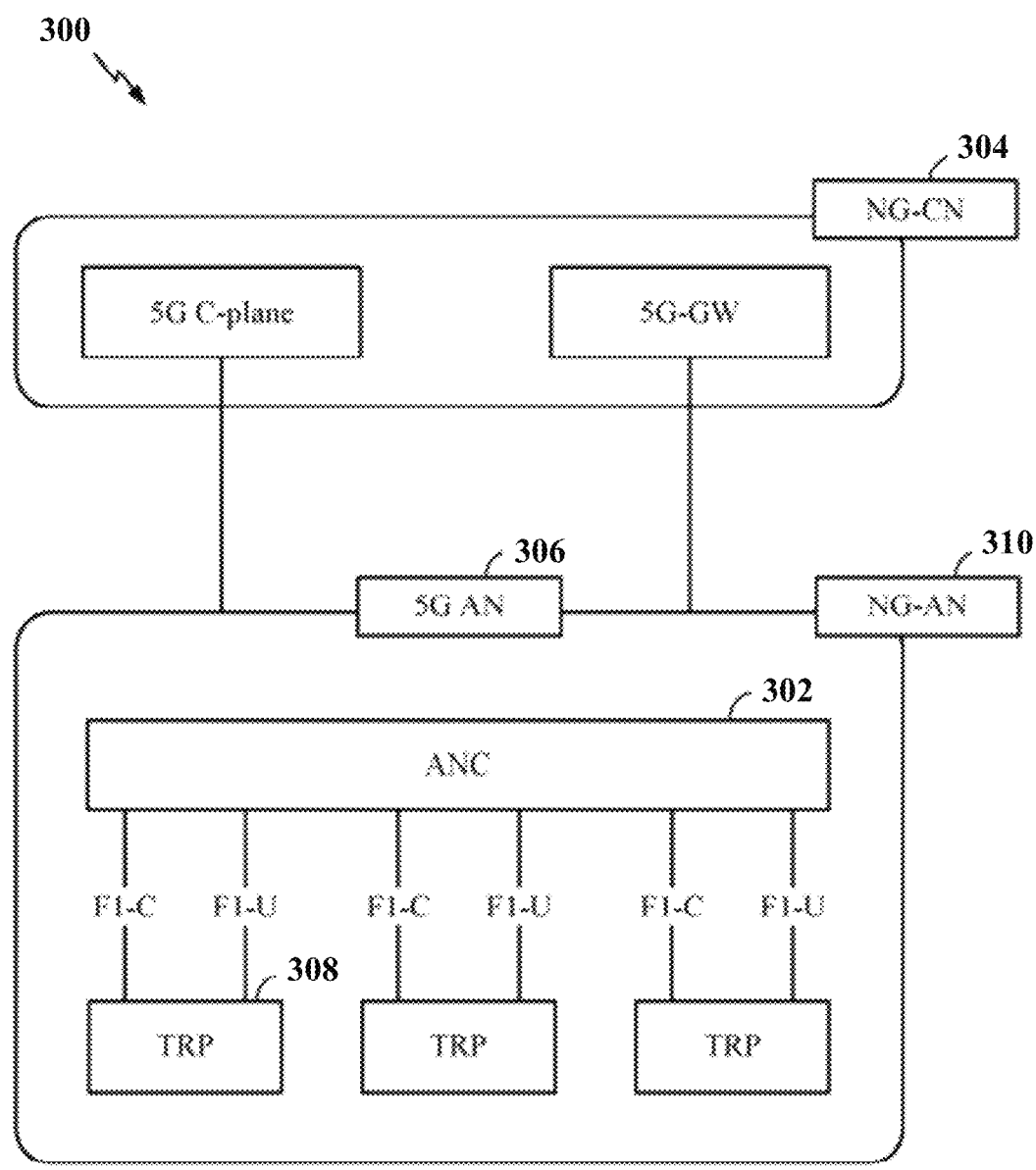
FIG. 3 illustrates an example logical architecture of a distributed access network.

FIG. 3 illustrates an example logical architecture 300 of a distributed RAN, according to aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
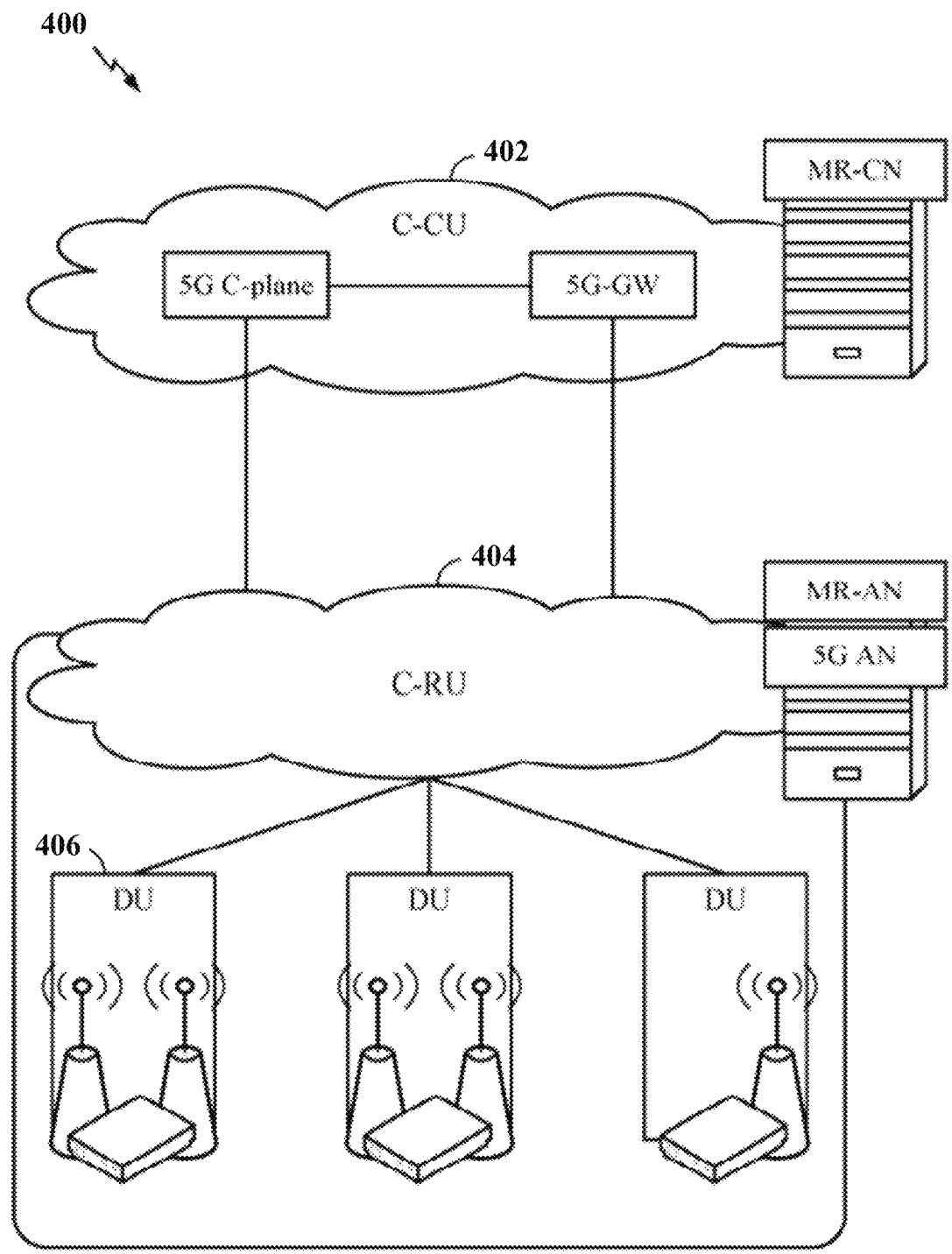
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
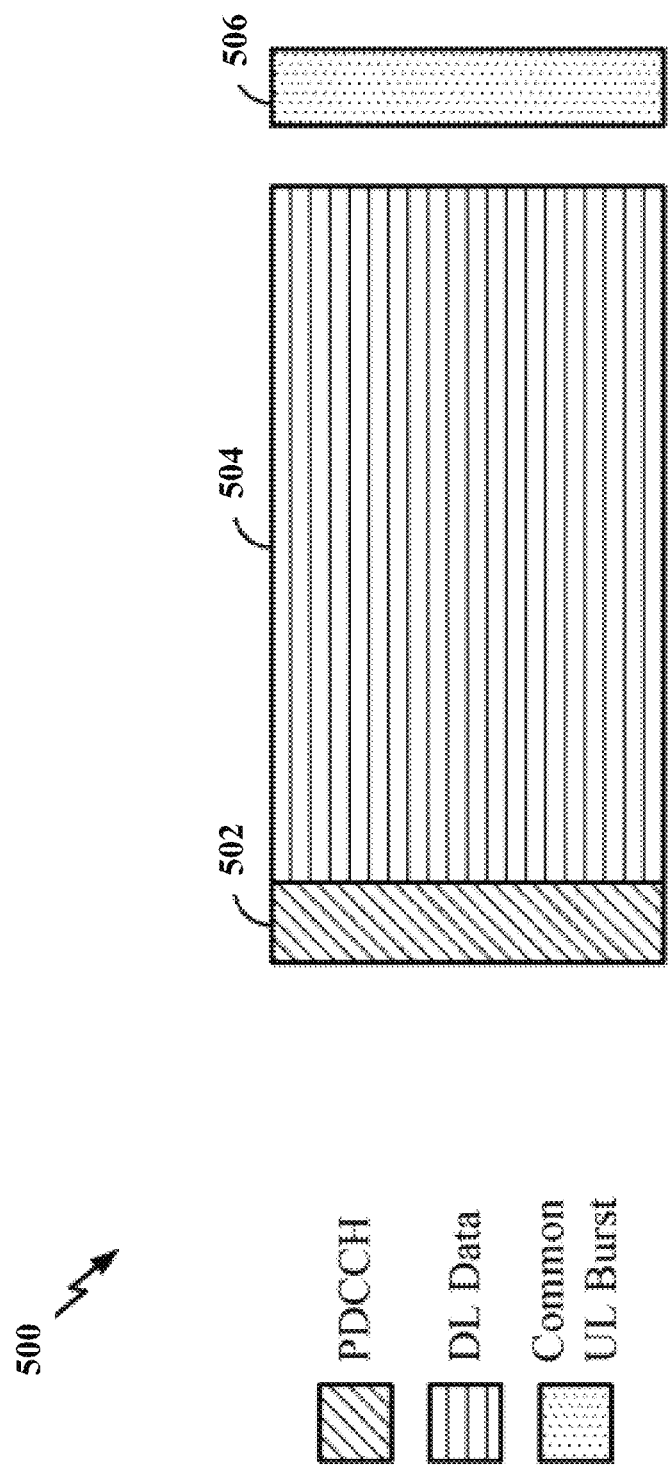
FIG. 5 is a diagram showing an example of a DL-centric subframe.

FIG. 5 is a diagram 500 showing an example of a DL-centric subframe. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6:
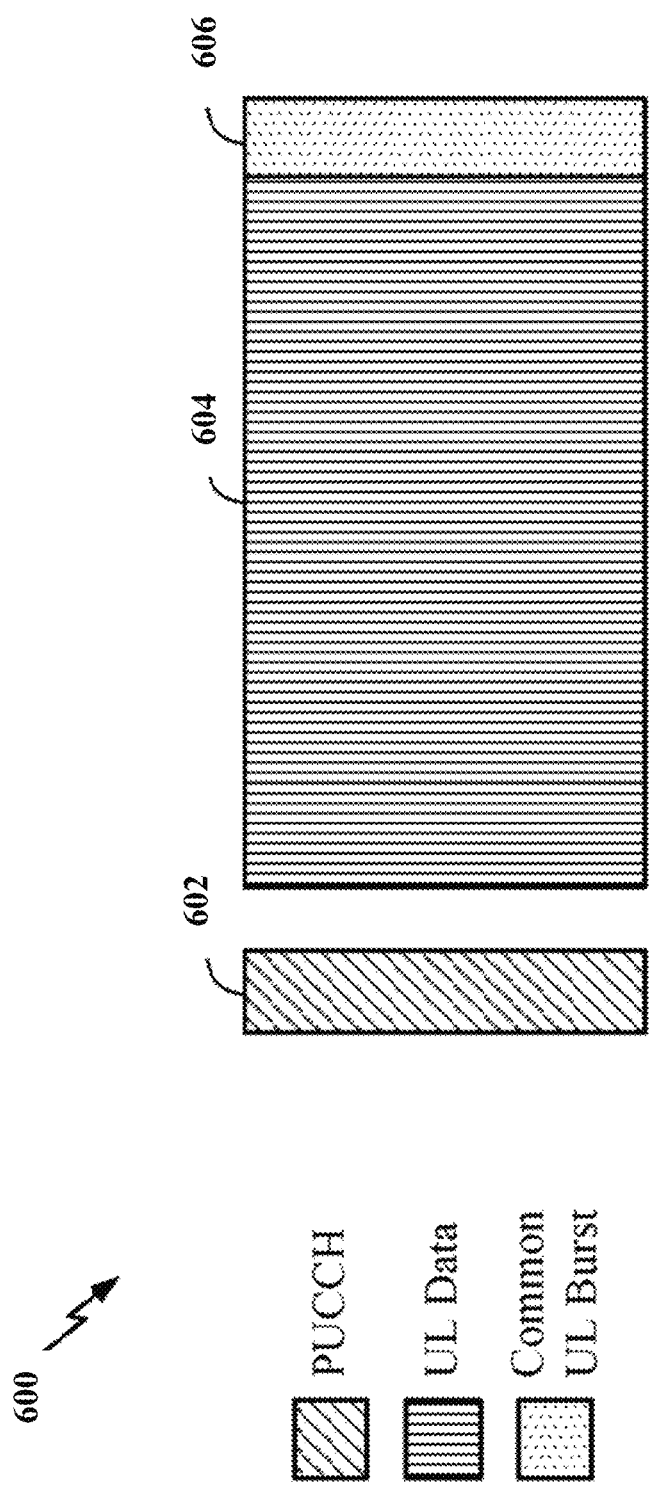
FIG. 6 is a diagram showing an example of an UL-centric subframe.

FIG. 6 is a diagram 600 showing an example of an UL-centric subframe. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the pay load of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switchover from DL communication (e.g., reception operation by the scheduling entity) to UL communication (e.g., transmission by the scheduling entity). The UL-centric subframe may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
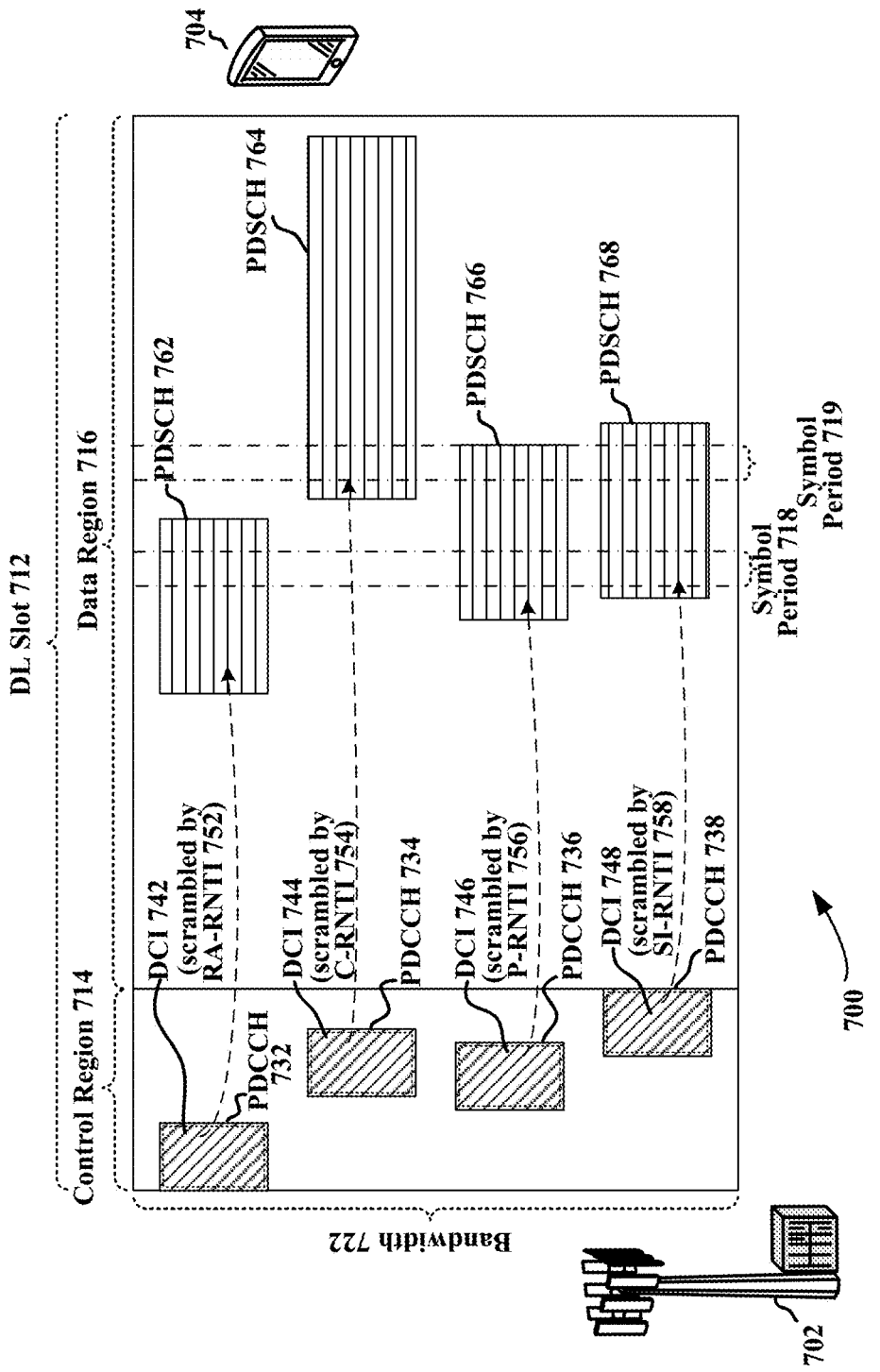
FIG. 7 is a diagram illustrating capabilities of a UE to decode multiple PDSCHs simultaneously.

FIG. 7 is a diagram 700 illustrating capabilities of a UE to decode multiple PDSCHs simultaneously. In this example, a base station 702 communicates with a UE 704 over a DL slot 712. The DL slot 712 occupies a bandwidth 722 in a frequency domain, and includes a control region 714 and a data region 716. In the control region 714, the base station 702 may transmit four downlink control information (DCI) 742, 744, 746 and 748 in four PDCCHs 732, 734, 736 and 738, respectively. The UE 704 may perform blind decoding at search spaces assigned to the UE 704 in the DL slot 712 to detect any PDCCH addressed to the UE 704. PDCCHs addressed to the UE 704 may be scrambled by one of a cell radio network temporary identifier (C-RNTI), a paging radio network temporary identifier (P-RNTI), a random access radio network temporary identifier (RA-RNTI), and a system information radio network temporary identifier (SI-RNTI) provided to the UE 704. More specifically, the DCI 744 in the PDCCH 734 is scrambled by a C-RNTI 752 and indicates a PDSCH 764 in the data region 716. In other words, the PDSCH 764 is scheduled with the C-RNTI 754. The base station 702 assigns a unique C-RNTI 754 to the UE 704. Therefore, the PDSCH 764 is only addressed to the UE 704 and is a unicast PDSCH. Further, in this example, a PDSCH 762 is scheduled with a RA-RNTI 752; a PDSCH 766 is scheduled with a P-RNTI 756; and a PDSCH 768 is scheduled with a SI-RNTI 758. Each of the RA-RNTI 752, the P-RNTI 756, and the SI-RNTI 758 may be shared by a group of UEs including the UE 704. Therefore, the PDSCHs 762, 766, 768 each may be addressed to multiple UEs and are broadcast PDSCHs.

In this example, the UE 704 receives modulation symbols of the three broadcast PDSCHs 762, 766 and 768 in a symbol period 718. The UE 704 may need to and may be able to decode the three broadcast PDSCHs 762, 766 and 768 simultaneously. Further, the UE receives modulation symbols of the unicast PDSCH 764 and the two broadcast PDSCHs 766 and 768 in a symbol period 719. The UE 704 may need to and may be able to decode the unicast PDSCH 764 and the two broadcast PDSCHs 766 and 768 simultaneously.

Figure 8:
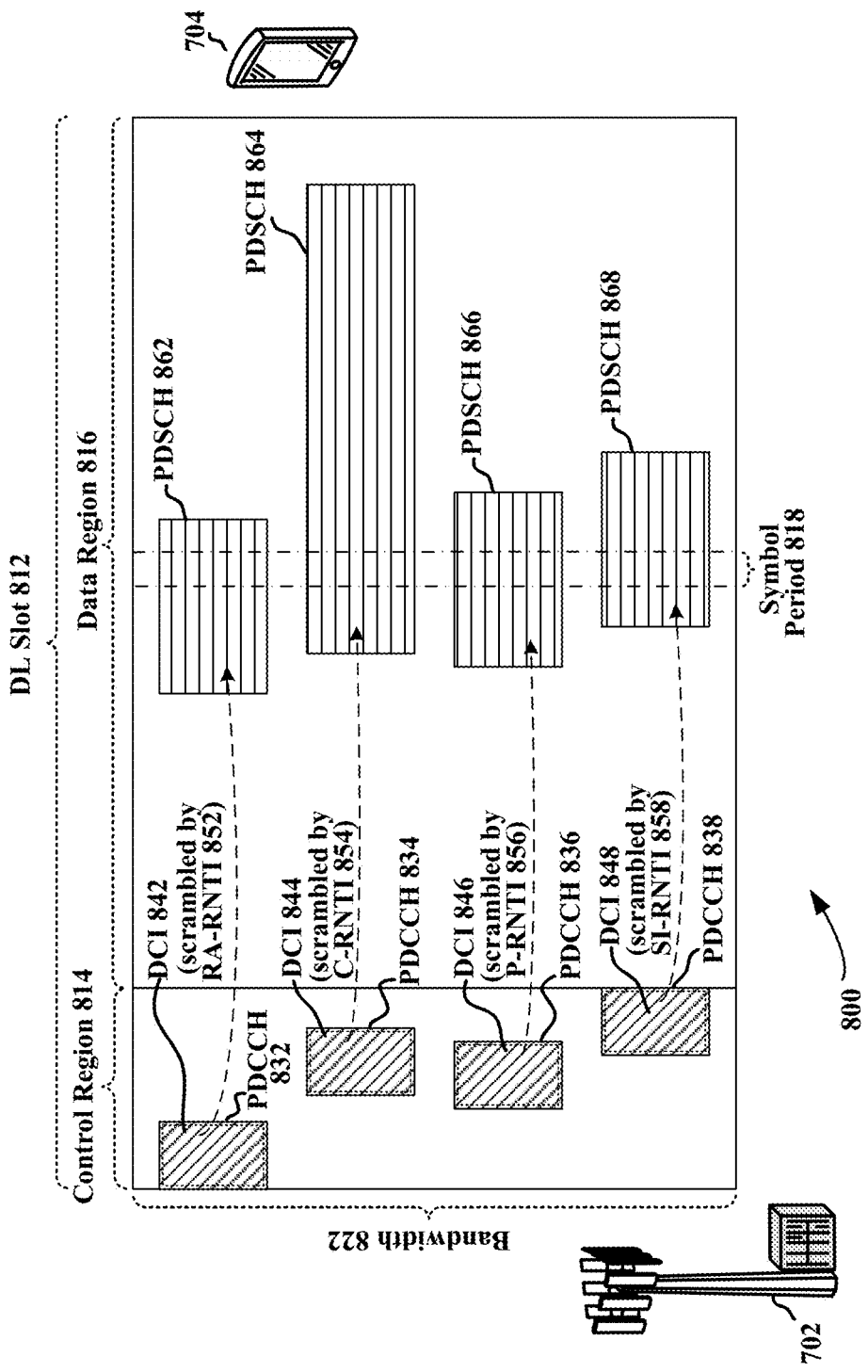
FIG. 8 is a diagram illustrating capabilities of a UE to decode multiple PDSCHs simultaneously.

FIG. 8 is a diagram 800 illustrating capabilities of a UE to decode multiple PDSCHs simultaneously. In this example, the base station 702 communicates with the UE 704 over a DL slot 812. The DL slot 812 occupies a bandwidth 822 in a frequency domain, and includes a control region 814 and a data region 816. In the control region 814, the base station 702 may transmit four DCIs 842, 844, 846 and 848 in four PDCCHs 832, 834, 836 and 838, respectively. A PDSCH 864 is scheduled with a C-RNTI 854 and is a unicast PDSCH. A PDSCH 862 is scheduled with a RA-RNTI 852; a PDSCH 866 is scheduled with a P-RNTI 856; and a PDSCH 868 is scheduled with a SI-RNTI 858. The PDSCHs 862, 866 and 868 are broadcast PDSCHs.

In this example, the UE 704 receives modulation symbols of the unicast PDSCH 864 and the three broadcast PDSCHs 862, 866 and 868 in a symbol period 818. The UE 704 may be incapable of decoding the unicast PDSCH 864 and the three broadcast PDSCHs 862, 866 and 868 simultaneously.

Figure 9:
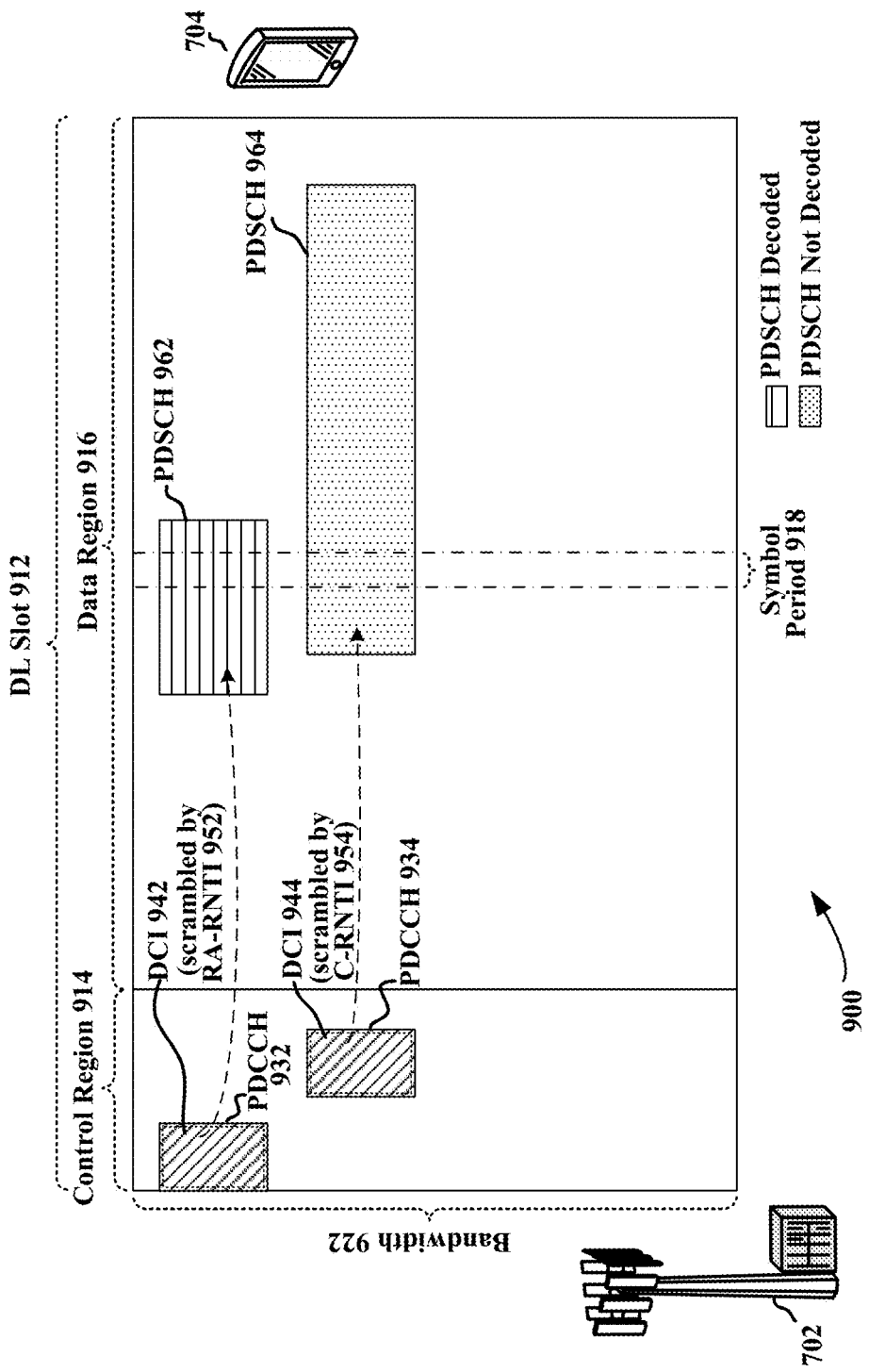
FIG. 9 is a diagram illustrating a first technique that can be employed by a UE to reduce simultaneous decoding of multiple PDSCHs.

FIG. 9 is a diagram 900 illustrating a first technique that can be employed by a UE to reduce simultaneous decoding of multiple PDSCHs. In this first technique, when a UE determines that one unicast PDSCH and one or more broadcast PDSCHs overlap with each other in a time domain, the UE, without considering transport block sizes (TBSs) of the one or more broadcast PDSCHs, may decide not to decode the unicast PDSCH. In other words, the UE may decide to refrain from decoding the unicast PDSCH independently of the TBSs of the one or more broadcast PDSCHs.

In this example, the base station 702 communicates with the UE 704 over a DL slot 912. The DL slot 912 occupies a bandwidth 922 in a frequency domain, and includes a control region 914 and a data region 916. In the control region 914, the base station 702 may transmit two DCI 942 and 944 in two PDCCHs 932 and 934, respectively. A PDSCH 962 is scheduled with a RA-RNTI 952 and is a broadcast PDSCH. A PDSCH 964 is scheduled with a C-RNTI 954 and is a unicast PDSCH.

Based on the DCI 942 and the DCI 944, the UE 704 can determine resources of the broadcast PDSCH 962 and the unicast PDSCH 964, respectively. In this example, the UE 704 further determines that the unicast PDSCH 964 and the broadcast PDSCH 962 overlap with each other in a symbol period 918. Accordingly, the UE 704 does not decode the unicast PDSCH 964. In other words, the UE 704 refrains from decoding the unicast PDSCH 964. The UE 704 may transmit a HARQ feedback to the base station 702 indicating that modulation symbols of the unicast PDSCH 964 are not successfully decoded.

Figure 10:
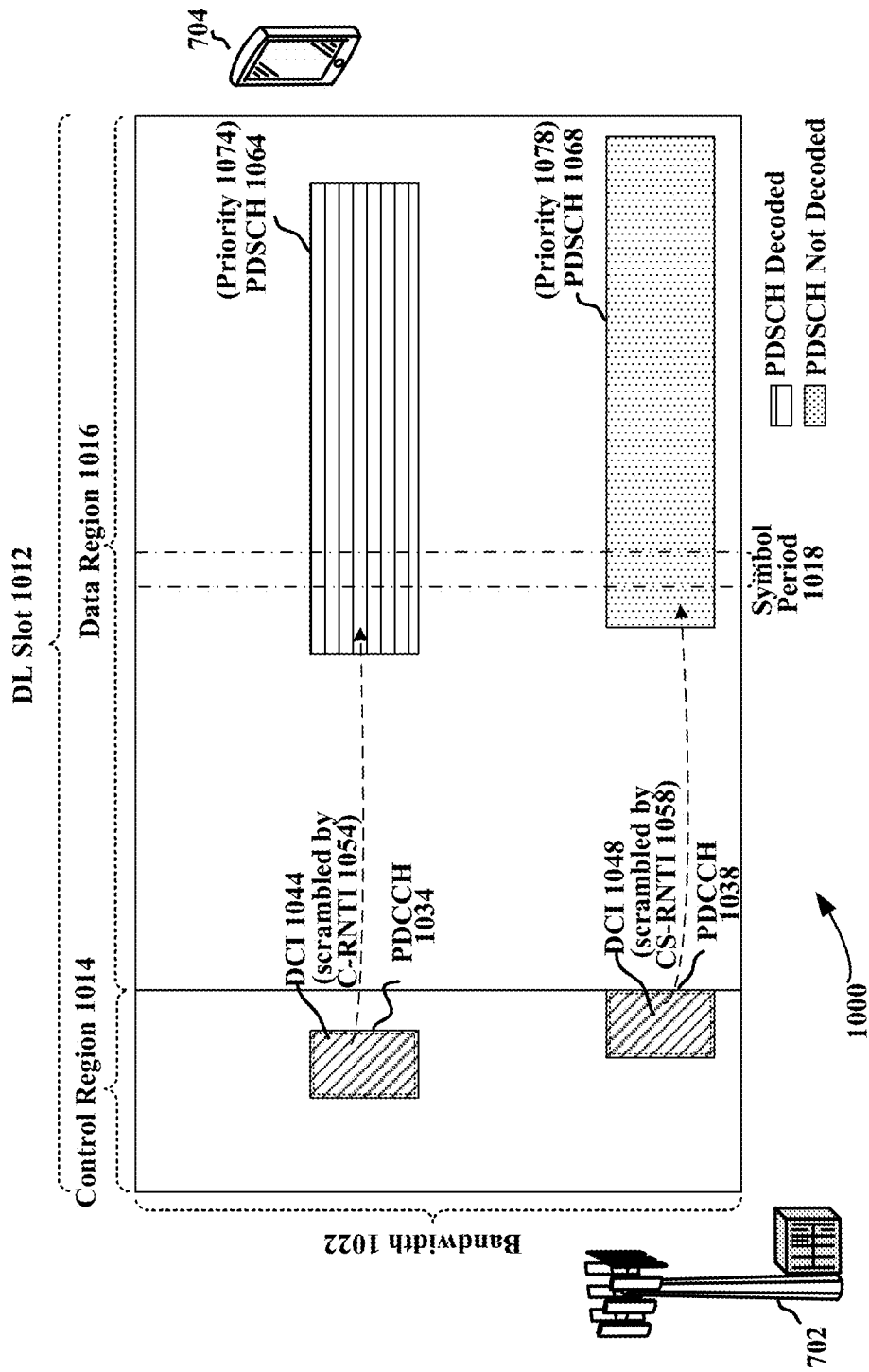
FIG. 10 is a diagram illustrating a second technique that can be employed by a UE to reduce simultaneous decoding of multiple PDSCHs.

FIG. 10 is a diagram 1000 illustrating a second technique that can be employed by a UE to reduce simultaneous decoding of multiple PDSCHs. In this example, the base station 702 communicates with a UE 704 over a DL slot 1012. The DL slot 1012 occupies a bandwidth 1022 in a frequency domain, and includes a control region 1014 and a data region 1016. In the control region 1014, the base station 702 may transmit two DCIs 1044 and 1048 in two PDCCHs 1034 and 1038, respectively. A PDSCH 1064 is scheduled with a C-RNTI 1054 and is a unicast PDSCH. A PDSCH 1068 is scheduled with a configured scheduled radio network temporary identifier (CS-RNTI) 1058. The PDSCH 1068 is only addressed to the UE 704 and is a unicast PDSCH. The PDSCH 1064 has a priority 1074, while the PDSCH 1068 has a priority 1078. In this example, the priority 1074 is higher than the priority 1078.

In this example, the UE 704 receives modulation symbols of the two unicast PDSCHs 1064 and 1068 in a symbol period 1018. The UE 704 may be incapable of decoding the two unicast PDSCHs 1064 and 1068 simultaneously.

In the second technique, when a UE determines that one unicast PDSCH and another unicast PDSCH overlap with each other in a time domain, the UE may decide not to decode the unicast PDSCH with a lower priority. In other words, the UE may refrain from decoding the unicast PDSCH with a lower priority.

In this example, based on the DCI 1044 and the DCI 1048, the UE 704 can determine resources of the unicast PDSCH 1064 and the unicast PDSCH 1068, respectively. In this example, the UE 704 further determines that the unicast PDSCH 1064 and the unicast PDSCH 1068 overlap with each other in a symbol period 1018. Accordingly, the UE 704 does not decode the unicast PDSCH 1068 because the priority 1078 is lower than the priority 1074. In other words, the UE 704 refrains from decoding the unicast PDSCH 1068. The UE 704 may transmit a HARQ feedback to the base station 702 indicating that modulation symbols of the unicast PDSCH 1068 are not successfully decoded.

Figure 11:
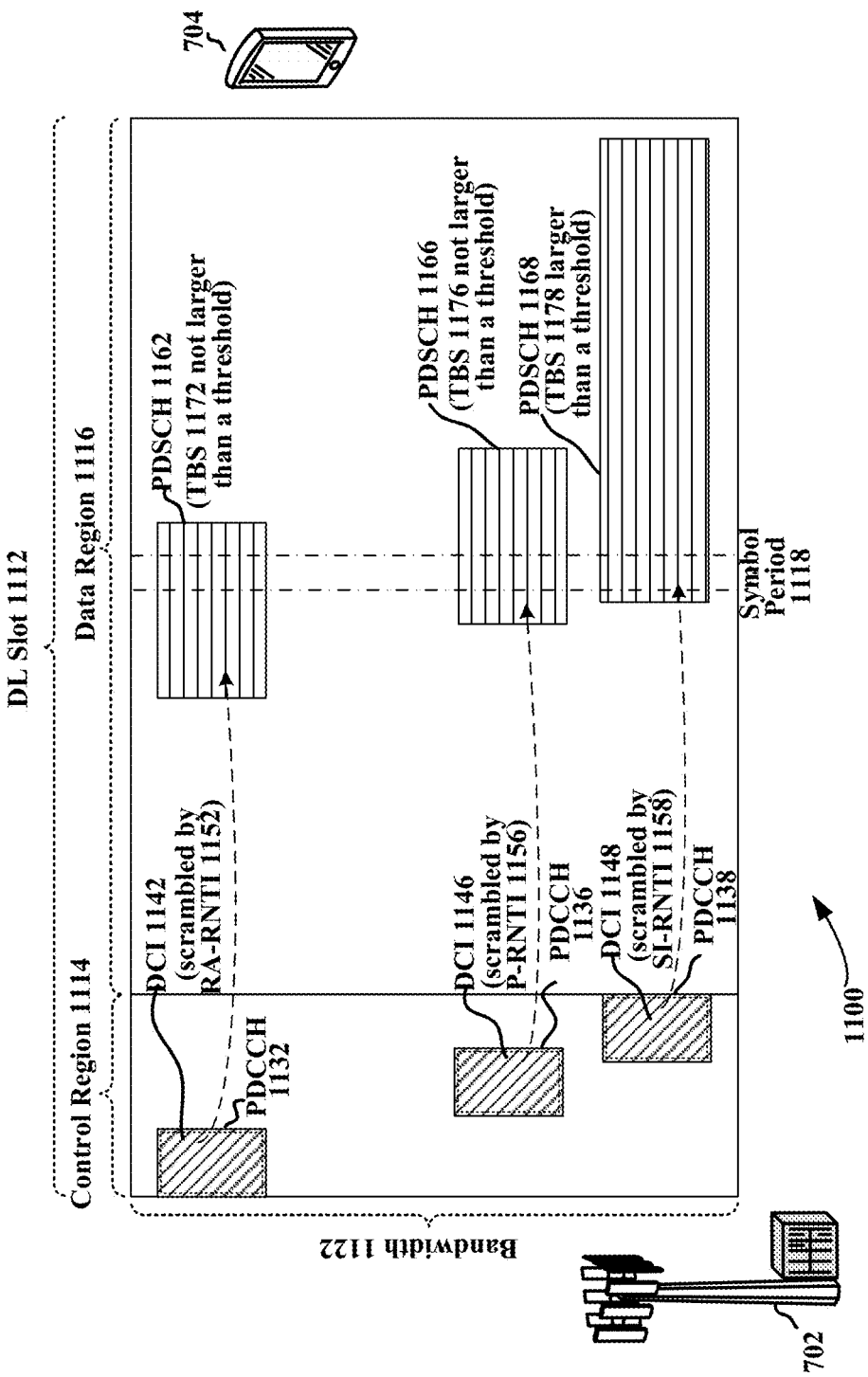
FIG. 11 is a diagram illustrating capabilities of a UE to decode multiple PDSCHs simultaneously.

FIG. 11 is a diagram 1100 illustrating capabilities of a UE to decode multiple PDSCHs simultaneously. In a third technique, a UE may consider a TBS of a PDSCH when determining whether to refrain from decoding an overlapping PDSCH. A broadcast PDSCH with a TBS larger than a predetermined threshold may be referred to as a "large broadcast PDSCH," while a broadcast PDSCH with a TBS equal to or smaller than the threshold may be referred to as a "normal broad PDSCH." TBSs of some broadcast PDSCHs may be large. For example, a PDSCH scheduled with a SI-RNTI may have a large TBS. When the TBSs of PDSCHs are considered, a UE may be configured only to support the following three tasks: (1) decoding one unicast PDSCH and up to two normal broadcast PDSCHs simultaneously; (2) decoding up to three normal broadcast PDSCHs simultaneously; and (3) decoding one large broadcast PDSCH and up to two normal broadcast PDSCHs simultaneously. The task (3) is illustrated in FIG. 11 infra. The tasks (1) and (2) are similar to the situations shown in FIG. 7 supra.

In this example illustrated in FIG. 11, the base station 702 communicates with the UE 704 over a DL slot 1112. The DL slot 1112 occupies a bandwidth 1122 in a frequency domain, and includes a control region 1114 and a data region 1116. In the control region 1114, the base station 702 may transmit three DCIs 1142, 1146 and 1148 in three PDCCHs 1132, 1136 and 1138, respectively. A PDSCH 1162 is scheduled with a RA-RNTI 1152 and is a normal broadcast PDSCH because a TBS 1172 is not larger than the threshold. A PDSCH 1166 is scheduled with a P-RNTI 1156 and is a normal broadcast PDSCH because a TBS 1176 is not larger than the threshold. A PDSCH 1168 is scheduled with a SI-RNTI 1158 and is a large broadcast PDSCH because a TBS 1178 is larger than the threshold.

In this example, the UE 704 receives modulation symbols of the large broadcast PDSCH 1168 and the two normal broadcast PDSCHs 1162 and 1166 in a symbol period 1118. The UE 704 may need to and may be able to decode the large broadcast PDSCH 1168 and the two normal broadcast PDSCHs 1162 and 1166 simultaneously.

Figure 12:
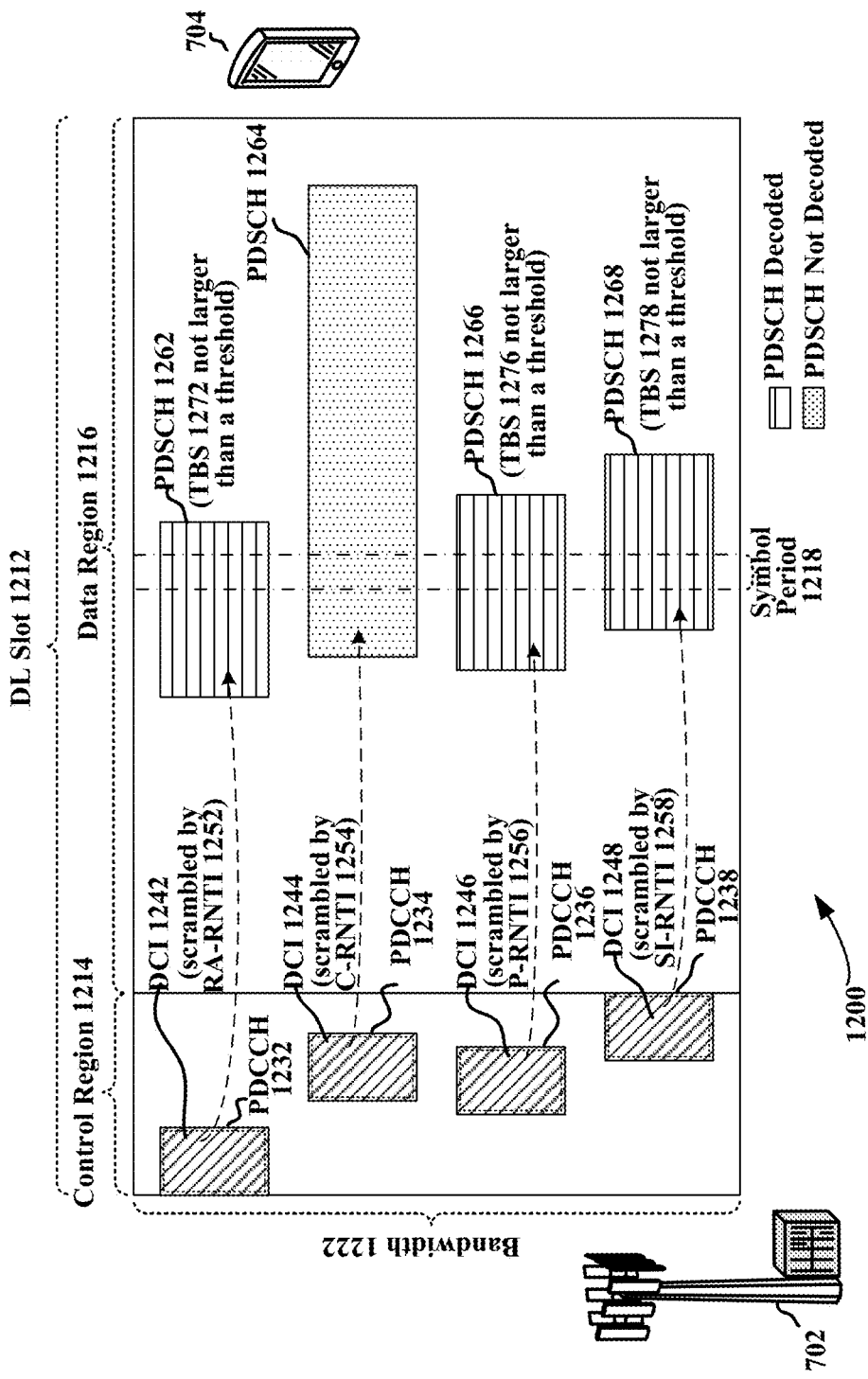
FIG. 12 is a diagram illustrating the third technique that can be employed by a UE to reduce simultaneous decoding of multiple PDSCHs.

FIG. 12 is a diagram 1200 illustrating the third technique that can be employed by a UE to reduce simultaneous decoding of multiple PDSCHs. In this example, a base station 702 communicates with a UE 704 over a DL slot 1212. The DL slot 1212 occupies a bandwidth 1222 in a frequency domain, and includes a control region 1214 and a data region 1216. In the control region 1214, the base station 702 may transmit four DCIs 1242, 1244, 1246 and 1248 in four PDCCHs 1232, 1234, 1236 and 1238, respectively. A PDSCH 1262 is scheduled with a RA-RNTI 1252 and is a normal broadcast PDSCH because a TBS 1272 is not larger than the threshold. A PDSCH 1264 is scheduled with a C-RNTI 1254 and is a unicast PDSCH. A PDSCH 1266 is scheduled with a P-RNTI 1256 and is a normal broadcast PDSCH, as a TBS 1276 of the PDSCH 1266 is not larger than the threshold. A PDSCH 1268 is scheduled with a SI-RNTI 1258 and is a normal broadcast PDSCH, as a TBS 1278 of the PDSCH 1268 is not larger than the threshold.

In this example, the UE 704 receives modulation symbols of the three normal broadcast PDSCHs 1262, 1266 and 1268 and the unicast PDSCH 1264 in a symbol period 1218. The UE 704 may be incapable of decoding the three normal broadcast PDSCHs 1262, 1266 and 1268 and the unicast PDSCH 1264 simultaneously.

In the third technique, when a UE determines that one unicast PDSCH and three normal broadcast PDSCHs overlap with each other (i.e., all occupy a same symbol period) in a time domain, the UE may decide not to decode the unicast PDSCH. In other words, the UE may refrain from decoding the unicast PDSCH.

In this example, based on the DCI 1242, 1244, 1246 and 1248, the UE 704 can determine resources of the three normal broadcast PDSCHs 1262, 1266 and 1268 and the unicast PDSCH 1264, respectively. The UE 704 further determines that the three normal broadcast PDSCHs 1262, 1266 and 1268 and the unicast PDSCH 1264 overlap with each other in a symbol period 1218. Accordingly, the UE 704 does not decode the unicast PDSCH 1264. In other words, the UE 704 refrains from decoding the unicast PDSCH 1264. The UE 704 may transmit a HARQ feedback to the base station 702 indicating that modulation symbols of the unicast PDSCH 1264 are not successfully decoded.

Figure 13:
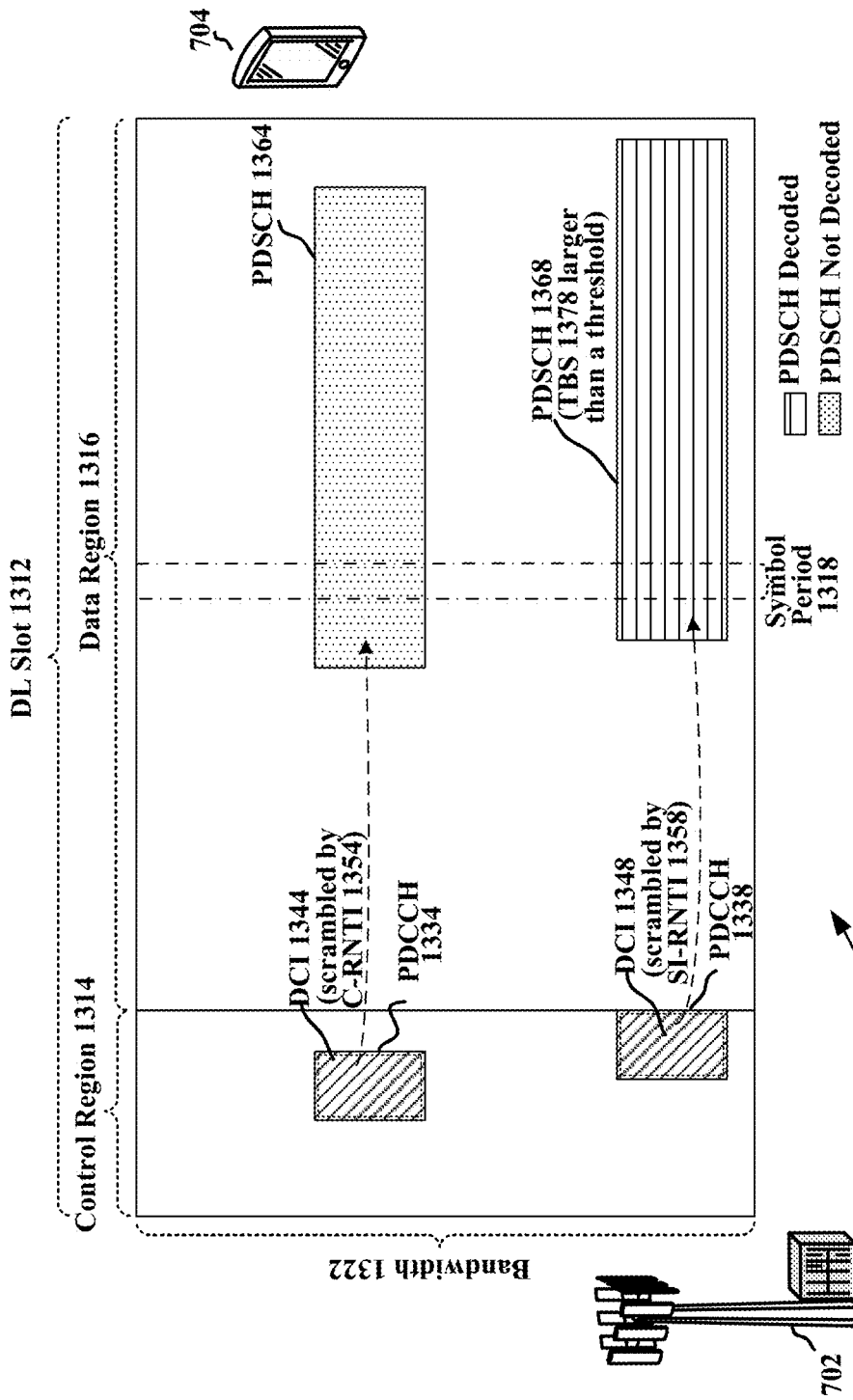
FIG. 13 is a diagram illustrating a fourth technique that can be employed by a UE to reduce simultaneous decoding of multiple PDSCHs.

FIG. 13 is a diagram 1300 illustrating a fourth technique that can be employed by a UE to reduce simultaneous decoding of multiple PDSCHs. In this example, a base station 702 communicates with a UE 704 over a DL slot 1312. The DL slot 1312 occupies a bandwidth 1322 in a frequency domain, and includes a control region 1314 and a data region 1316. In the control region 1314, the base station 702 may transmit two DCIs 1344 and 1348 in two PDCCHs 1334 and 1338, respectively. A PDSCH 1364 is scheduled with a C-RNTI 1354 and is a unicast PDSCH. A PDSCH 1368 is scheduled with a SI-RNTI 1358 and is a large broadcast PDSCH because a TBS 1378 is larger than the threshold.

In this example, the UE 704 receives modulation symbols of the large broadcast PDSCHs 1368 and the unicast PDSCH 1364 in a symbol period 1318. The UE 704 may be incapable of decoding the large broadcast PDSCHs 1368 and the unicast PDSCH 1364 simultaneously.

In the fourth technique, when a UE determines that one unicast PDSCH and one large broadcast PDSCH overlap with each other in a time domain, the UE may decide not to decode the unicast PDSCH. In other words, the UE may refrain from decoding the unicast PDSCH.

In this example, based on the DCI 1344 and 1348, the UE 704 can determine resources of the large broadcast PDSCH 1368 and the unicast PDSCH 1364, respectively. In this example, the UE 704 further determines that the large broadcast PDSCH 1368 and the unicast PDSCH 1364 overlap with each other in a symbol period 1318. Accordingly, the UE 704 does not decode the unicast PDSCH 1364. In other words, the UE 704 refrains from decoding the unicast PDSCH 1364. The UE 704 may transmit a HARQ feedback to the base station 702 indicating that modulation symbols of the unicast PDSCH 1364 are not successfully decode.

Further, on a frequency range 1 cell (e.g., a cell whose frequency band is below 10 GHz), the UE 704 may be able to decode a PDSCH scheduled with C-RNTI, Modulation Coding Scheme Cell RNTI (MCS-C-RNTI), or CS-RNTI and, during a process of P-RNTI triggered SI acquisition, another PDSCH scheduled with SI-RNTI that partially or fully overlap in time in non-overlapping PRBs, unless the PDSCH scheduled with C-RNTI or CS-RNTI requires a predetermined processing time (e.g., 3, 4.5, or 9 OFDM symbols) in which case the UE 704 may skip decoding of the scheduled PDSCH with C-RNTI or CS-RNTI.

On a frequency range 2 cell (e.g., a cell whose frequency band is above 10 GHz), the UE is not expected to decode a PDSCH scheduled with C-RNTI, MCS-C-RNTI, or CS-RNTI if in the same cell, during a process of P-RNTI triggered SI acquisition, another PDSCH scheduled with SI-RNTI partially or fully overlap in time in non-overlapping PRBs.

Further, the UE 704 is not expected to decode a PDSCH scheduled with C-RNTI, MCS-C-RNTI, or CS-RNTI if another PDSCH in the same cell scheduled with RA-RNTI partially or fully overlap in time.

Figure 14:
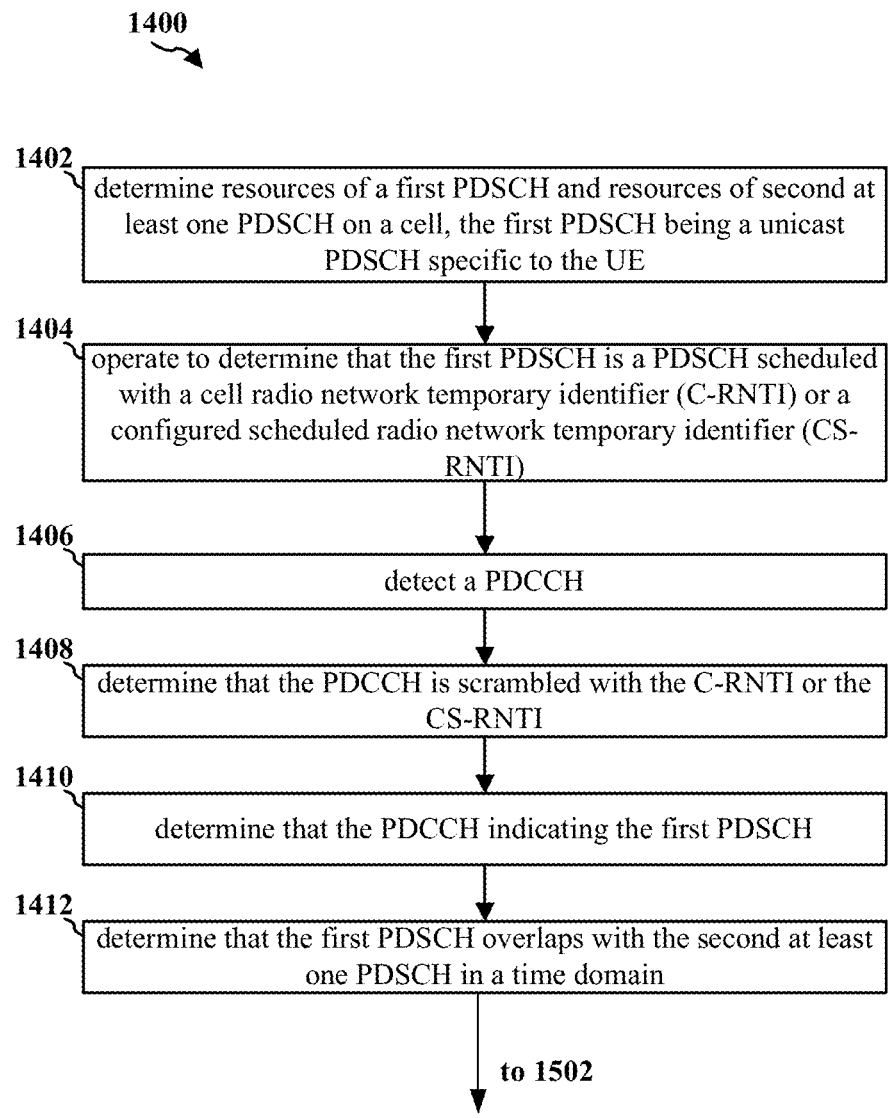
FIG. 14 is a flow chart illustrating a method (process) of reducing simultaneous decoding of multiple PDSCHs.

FIG. 14 is a flow chart 1400 illustrating a method (process) of reducing simultaneous decoding of multiple PDSCHs. The method may be performed by a UE (e.g., the UE 704, the apparatus 1902/1902'). At operation 1402, the UE 704 determines resources of a first PDSCH (e.g., the PDSCH 1264) and resources of second at least one PDSCH (e.g., the PDSCHs 1262, 1266 and 1268) on a cell, and the first PDSCH is a unicast PDSCH specific to the UE. At operation 1404, the UE 704 operates to determine that the first PDSCH is a PDSCH scheduled with a C-RNTI (e.g., the C-RNTI 1054) or a CS-RNTI (e.g., the CS-RNTI 1058). At operation 1406, the UE 704 detects a PDCCH. At operation 1408, the UE 704 determines that the PDCCH is scrambled with the C-RNTI or the CS-RNTI. At operation 1408, the UE 704 determines that the PDCCH indicating the first PDSCH (e.g., the PDSCH 1064 or 1068). At operation 1412, the UE 704 determines that the first PDSCH (e.g., the PDSCH 1068) overlaps with the second at least one PDSCH (e.g., the PDSCH 1064) in a time domain (e.g., the DL slot 1012). Operation 1412 is followed by operation 1502 in FIG. 15.

Figure 15:
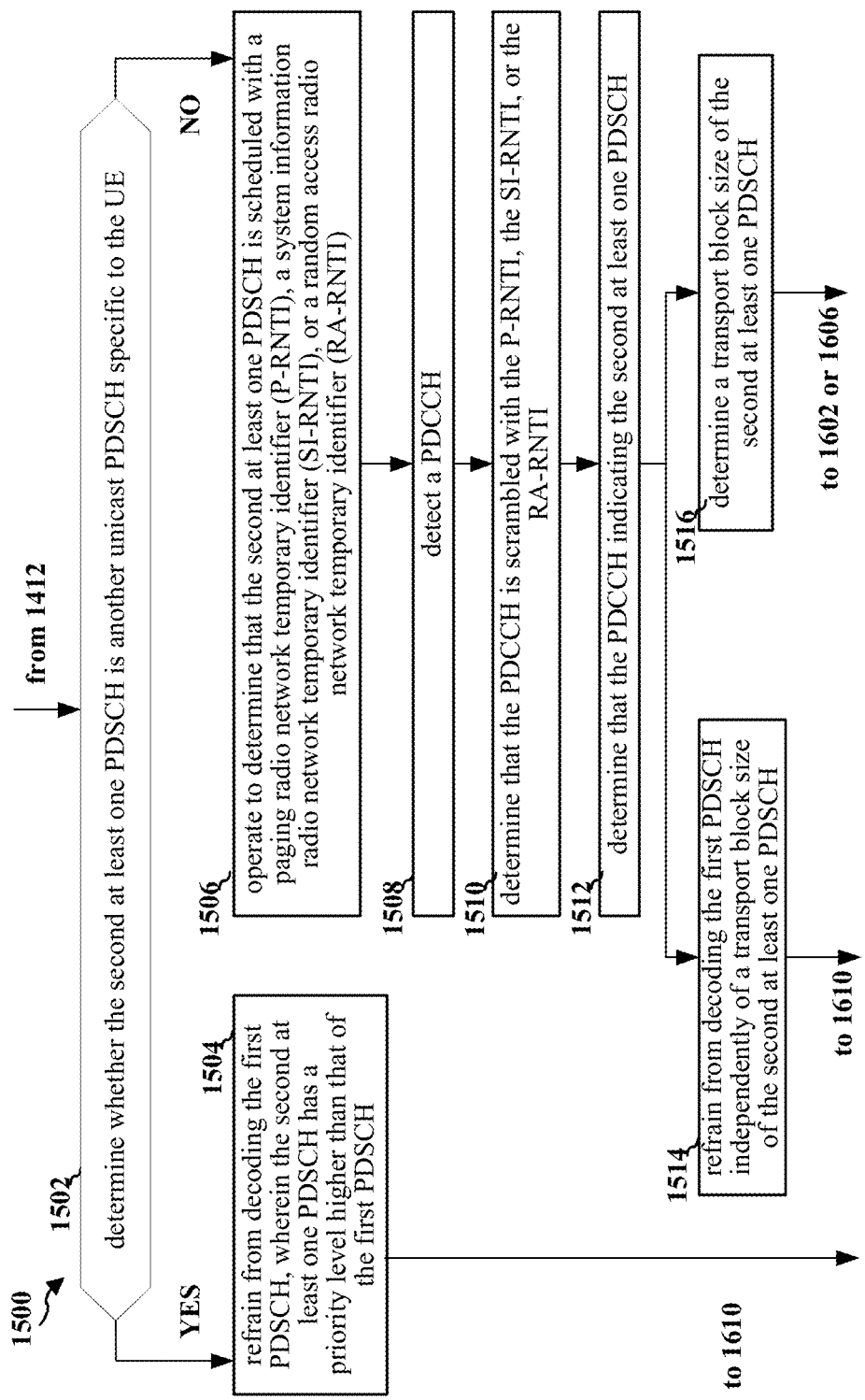
FIG. 15 is a flow chart illustrating a method (process) of reducing simultaneous decoding of multiple PDSCHs.

FIG. 15 is a flow chart 1500 illustrating a method (process) of reducing simultaneous decoding of multiple PDSCHs. The method may be performed by a UE (e.g., the UE 704, the apparatus 1902/1902'). At operation 1502, the UE 704 determines whether the second at least one PDSCH is another unicast PDSCH specific to the UE. When the second at least one PDSCH (e.g., the PDSCH 1064) is another unicast PDSCH specific to the UE, at operation 1504, the UE 704 refrains from decoding the first PDSCH (e.g., the PDSCH 1068), and the second at least one PDSCH has a priority level (e.g., the priority 1074) higher than that of the first PDSCH (e.g., the priority 1078). Operation 1504 is followed by operation 1610 in FIG. 16. In some configurations, the second at least one PDSCH is scheduled with a C-RNTI or a CS-RNTI.

When the second at least one PDSCH is not another unicast PDSCH specific to the UE, and a duration required for decoding the first PDSCH meets a duration threshold (e.g., 3, 4.5, or 9 OFDM symbols), and the cell is in a first frequency range (e.g., a cell whose frequency band is below 10 GHz), at operation 1506, the UE 704 operates to determine that the second at least one PDSCH is scheduled with a P-RNTI (e.g., the P-RNTI 856), a SI-RNTI (e.g., the SI-RNTI 858), or a RA-RNTI (e.g., the RA-RNTI 852). The second at least one PDSCH is determined not to be another unicast PDSCH specific to the UE. At operation 1508, the UE 704 detects a PDCCH. At operation 1510, the UE 704 determines that the PDCCH is scrambled with the P-RNTI, the SI-RNTI, or the RA-RNTI. At operation 1512, the UE 704 determines that the PDCCH indicating the second at least one PDSCH.

At operation 1514, the UE 704 refrains from decoding the first PDSCH (e.g., the PDSCH 964) independently of a transport block size of the second at least one PDSCH (e.g., the PDSCH 962). The decoding the first PDSCH is refrained from independently of a transport block size of the second at least one PDSCH. Operation 1514 is followed by operation 1610 in FIG. 16.

Alternatively at operation 1516, the UE 704 determines a transport block size (e.g. the TBS 1172) of the second at least one PDSCH (e.g., the PDSCH 1162). Operation 1516 is followed by operation 1602 or 1606 in FIG. 16.

Figure 16:
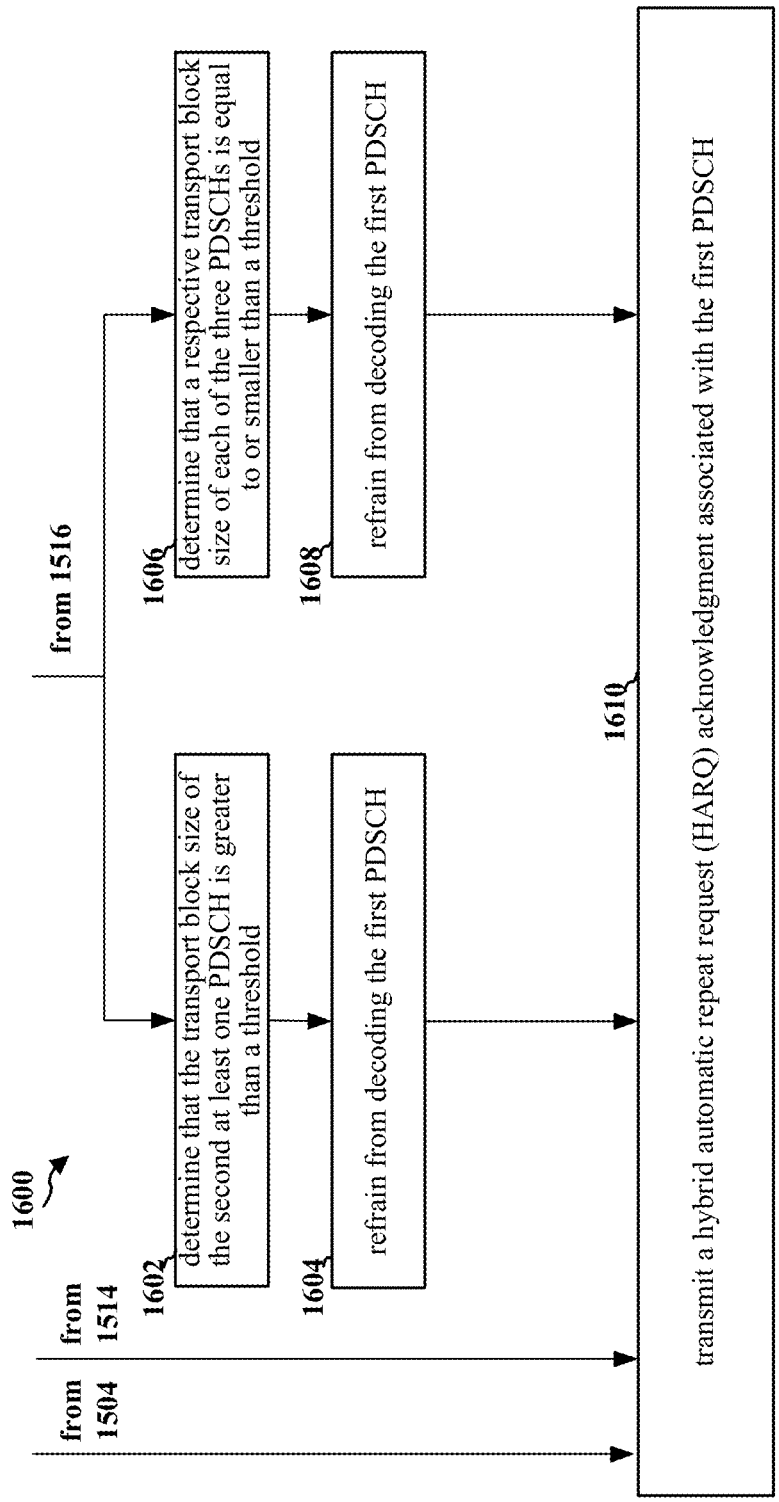
FIG. 16 is a flow chart illustrating a method (process) of reducing simultaneous decoding of multiple PDSCHs.

FIG. 16 is a flow chart 1600 illustrating a method (process) of reducing simultaneous decoding of multiple PDSCHs. The method may be performed by a UE (e.g., the UE 704, the apparatus 1902/1902'). At operation 1602, the UE 704 determines that the transport block size (e.g., the TBS 1378) of the second at least one PDSCH (e.g., the PDSCH 1368) is greater than a threshold. At operation 1604, the UE 704 refrains from decoding the first PDSCH (e.g., the first PDSCH 1364).

Alternatively at operation 1606, when the second at least one PDSCH includes three PDSCHs (e.g., the PDSCHs 1262, 1266 and 1268), the UE 704 determines that a respective transport block size (e.g., the TBSs 1272, 1276 and 1278) of each of the three PDSCHs is equal to or smaller than a threshold. In some configurations, the determining that the first PDSCH overlaps with the second at least one PDSCH in the time domain includes determining that the three PDSCHs all occupy a same symbol period (e.g., the symbol period 1218). At operation 1608, the UE 704 refrains from decoding the first PDSCH (e.g., the PDSCH 1264).

At operation 1610, the UE 704 transmits a HARQ acknowledgment associated with the first PDSCH (e.g., the PDSCH 1264).

Figure 17:
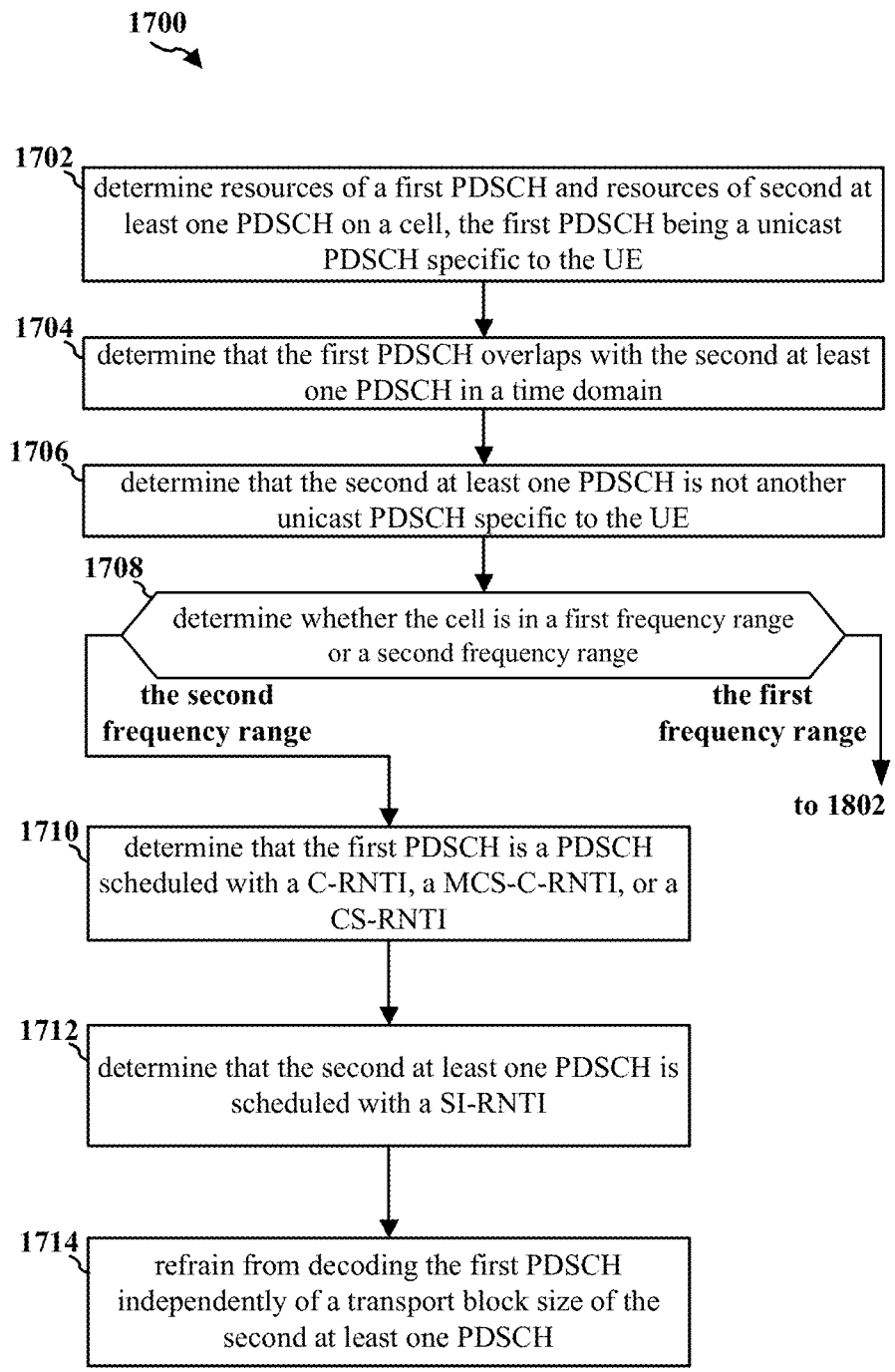
FIG. 17 is a flow chart illustrating a method (process) of reducing simultaneous decoding of multiple PDSCHs.

FIG. 17 is a flow chart 1700 illustrating a method (process) of reducing simultaneous decoding of multiple PDSCHs. The method may be performed by a UE (e.g., the UE 704, the apparatus 1902/1902'). At operation 1702, the UE 704 determines resources of a first PDSCH and resources of second at least one PDSCH on a cell, and the first PDSCH is a unicast PDSCH specific to the UE. At operation 1704, the UE 704 determines that the first PDSCH overlaps with the second at least one PDSCH in a time domain. At operation 1706, the UE 704 determines that the second at least one PDSCH is not another unicast PDSCH specific to the UE. At operation 1708, the UE 704 determines whether the cell is in a first frequency range or a second frequency range (e.g., a cell whose frequency band is above 10 GHz).

When the UE 704 determines that the cell is in the second frequency range, at operation 1710, the UE 704 determines that the first PDSCH is a PDSCH scheduled with a C-RNTI, a MCS-C-RNTI, or a CS-RNTI. At operation 1712, the UE 704 determines that the second at least one PDSCH is scheduled with a SI-RNTI. At operation 1714, the UE 704 refrains from decoding the first PDSCH independently of a transport block size of the second at least one PDSCH.

Figure 18:
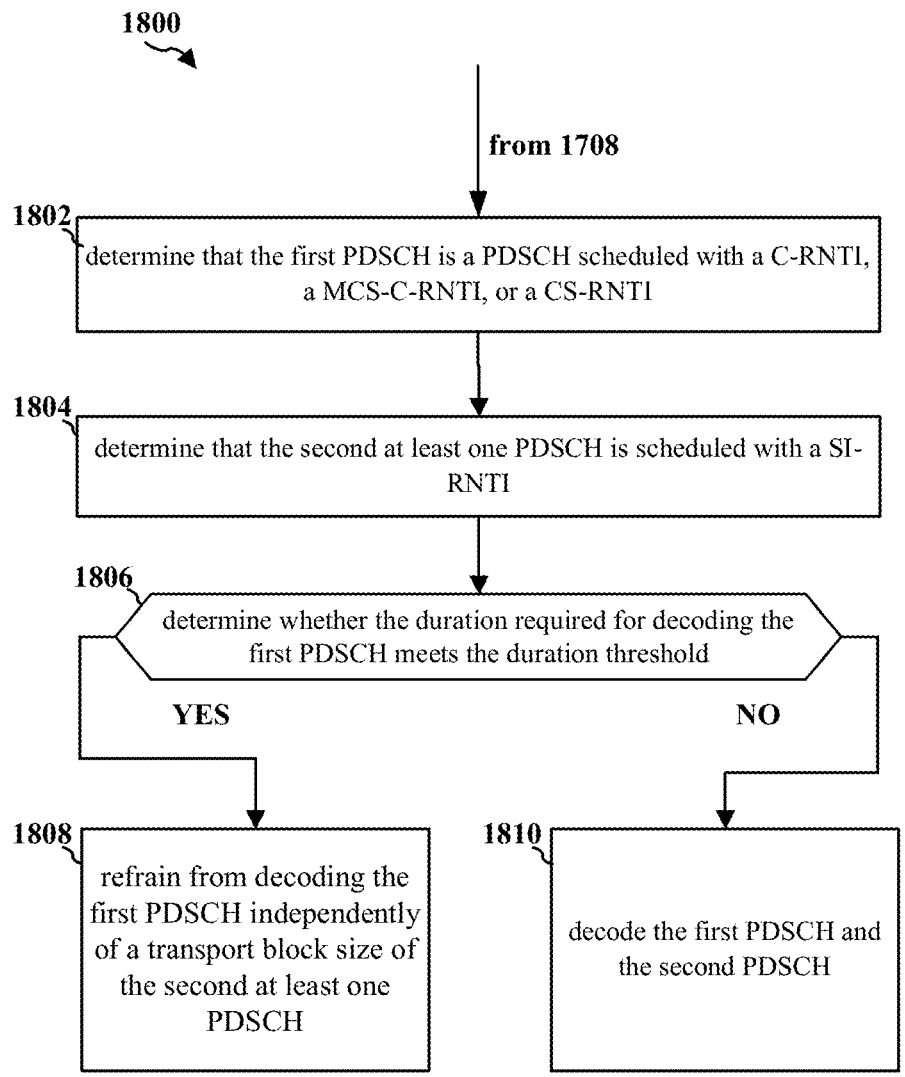
FIG. 18 is a flow chart illustrating a method (process) of reducing simultaneous decoding of multiple PDSCHs.

When the UE 704 determines that the cell is in the first frequency range, operation 1708 is followed by operation 1802 in FIG. 18.

FIG. 18 is a flow chart 1800 illustrating a method (process) of reducing simultaneous decoding of multiple PDSCHs. The method may be performed by a UE (e.g., the UE 704, the apparatus 1902/1902'). At operation 1802, the UE 704 determines that the first PDSCH is a PDSCH scheduled with a C-RNTI, a MCS-C-RNTI, or a CS-RNTI. At operation 1804, the UE 704 determines that the second at least one PDSCH is scheduled with a SI-RNTI. At operation 1806, the UE 704 determines whether the duration required for decoding the first PDSCH meets the duration threshold (e.g., 3, 4.5, or 9 OFDM symbols).

When the UE 704 determines that the duration required for decoding the first PDSCH meets the duration threshold, at operation 1808, the UE 704 refrains from decoding the first PDSCH independently of a transport block size of the second at least one PDSCH.

When the UE 704 determines that the duration required for decoding the first PDSCH does not meet the duration threshold, at operation 1810, the UE 704 decodes the first PDSCH and the second PDSCH.

Figure 19:
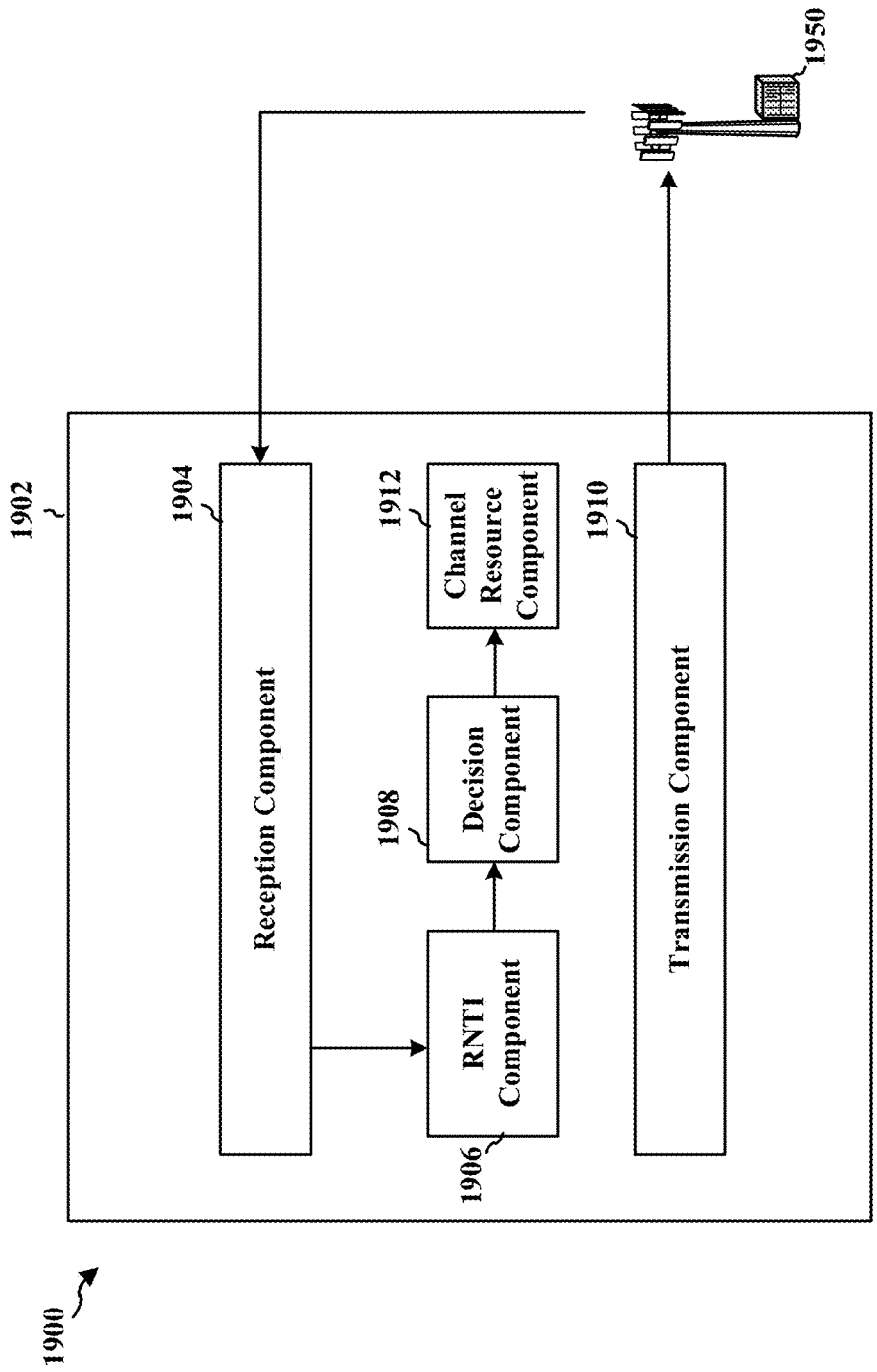
FIG. 19 is a conceptual data flow diagram illustrating the data flow between different components/means in an exemplary apparatus.

FIG. 19 is a conceptual data flow diagram 1900 illustrating the data flow between different components/means in an exemplary apparatus 1902. The apparatus 1902 may be a UE. The apparatus 1902 includes a reception component 1904, a RNTI component 1906, a decision component 1908, a channel resource component 1912, and a transmission component 1910.

The channel resource component 1912 determines resources of a first PDSCH (e.g., the PDSCH 1264) and resources of second at least one PDSCH (e.g., the PDSCHs 1262, 1266 and 1268) on a cell, and the first PDSCH is a unicast PDSCH specific to the UE. The RNTI component 1906 operates to determine that the first PDSCH is a PDSCH scheduled with a C-RNTI (e.g., the C-RNTI 1054) or a CS-RNTI (e.g., the CS-RNTI 1058). The channel resource component 1912 detects a PDCCH. The RNTI component 1906 determines that the PDCCH is scrambled with the C-RNTI or the CS-RNTI. The channel resource component 1912 determines that the PDCCH indicating the first PDSCH (e.g., the PDSCH 1064 or 1068). The decision component 1908 determines that the first PDSCH (e.g., the PDSCH 1068) overlaps with the second at least one PDSCH (e.g., the PDSCH 1064) in a time domain (e.g., the DL slot 1012).

The decision component 1908 determines whether the second at least one PDSCH is another unicast PDSCH specific to the UE. When the second at least one PDSCH (e.g., the PDSCH 1064) is another unicast PDSCH specific to the UE, the decision component 1908 refrains from decoding the first PDSCH (e.g., the PDSCH 1068), and the second at least one PDSCH has a priority level (e.g., the priority 1074) higher than that of the first PDSCH (e.g., the priority 1078). In some configurations, the second at least one PDSCH is scheduled with a C-RNTI or a CS-RNTI.

When the second at least one PDSCH is not another unicast PDSCH specific to the UE, and a duration required for decoding the first PDSCH meets a duration threshold (e.g., 3, 4.5, or 9 OFDM symbols), and the cell is in a first frequency range (e.g., a cell whose frequency band is below 10 GHz), the RNTI component 1906 operates to determine that the second at least one PDSCH is scheduled with a P-RNTI (e.g., the P-RNTI 856), a SI-RNTI (e.g., the SI-RNTI 858), or a RA-RNTI (e.g., the RA-RNTI 852). The second at least one PDSCH is determined not to be another unicast PDSCH specific to the UE. The channel resource component 1912 detects a PDCCH. The RNTI component 1906 determines that the PDCCH is scrambled with the P-RNTI, the SI-RNTI, or the RA-RNTI. The channel resource component 1912 determines that the PDCCH indicating the second at least one PDSCH.

The decision component 1908 refrains from decoding the first PDSCH (e.g., the PDSCH 964) independently of a transport block size of the second at least one PDSCH (e.g., the PDSCH 962). The decoding the first PDSCH is refrained from independently of a transport block size of the second at least one PDSCH.

Alternatively, the channel resource component 1912 determines a transport block size (e.g. the TBS 1172) of the second at least one PDSCH (e.g., the PDSCH 1162).

The channel resource component 1912 determines that the transport block size (e.g., the TBS 1378) of the second at least one PDSCH (e.g., the PDSCH 1368) is greater than a threshold. The decision component 1908 refrains from decoding the first PDSCH (e.g., the first PDSCH 1364).

Alternatively when the second at least one PDSCH includes three PDSCHs (e.g., the PDSCHs 1262, 1266 and 1268), the channel resource component 1912 determines that a respective transport block size (e.g., the TBSs 1272, 1276 and 1278) of each of the three PDSCHs is equal to or smaller than a threshold. In some configurations, the determining that the first PDSCH overlaps with the second at least one PDSCH in the time domain includes determining that the three PDSCHs all occupy a same symbol period (e.g., the symbol period 1218). The decision component 1908 refrains from decoding the first PDSCH (e.g., the PDSCH 1264).

The transmission component 1910 transmits a HARQ acknowledgment associated with the first PDSCH (e.g., the PDSCH 1264).

The channel resource component 1912 determines resources of a first PDSCH and resources of second at least one PDSCH on a cell, and the first PDSCH is a unicast PDSCH specific to the UE. The decision component 1908 determines that the first PDSCH overlaps with the second at least one PDSCH in a time domain. The decision component 1908 determines that the second at least one PDSCH is not another unicast PDSCH specific to the UE. The decision component 1908 determines whether the cell is in a first frequency range or a second frequency range (e.g., a cell whose frequency band is above 10 GHz).

When the decision component 1908 determines that the cell is in the second frequency range, the RNTI component 1906 determines that the first PDSCH is a PDSCH scheduled with a C-RNTI, a MCS-C-RNTI, or a CS-RNTI. The RNTI component 1906 determines that the second at least one PDSCH is scheduled with a SI-RNTI. The decision component 1908 refrains from decoding the first PDSCH independently of a transport block size of the second at least one PDSCH.

When the decision component 1908 determines that the cell is in the first frequency range, the RNTI component 1906 determines that the first PDSCH is a PDSCH scheduled with a C-RNTI, a MCS-C-RNTI, or a CS-RNTI. The RNTI component 1906 determines that the second at least one PDSCH is scheduled with a SI-RNTI. The decision component 1908 determines whether the duration required for decoding the first PDSCH meets the duration threshold (e.g., 3, 4.5, or 9 OFDM symbols).

When the decision component 1908 determines that the duration required for decoding the first PDSCH meets the duration threshold, the decision component 1908 refrains from decoding the first PDSCH independently of a transport block size of the second at least one PDSCH.

When the decision component 1908 determines that the duration required for decoding the first PDSCH does not meet the duration threshold, the channel resource component 1908 decodes the first PDSCH and the second PDSCH.

Figure 20:
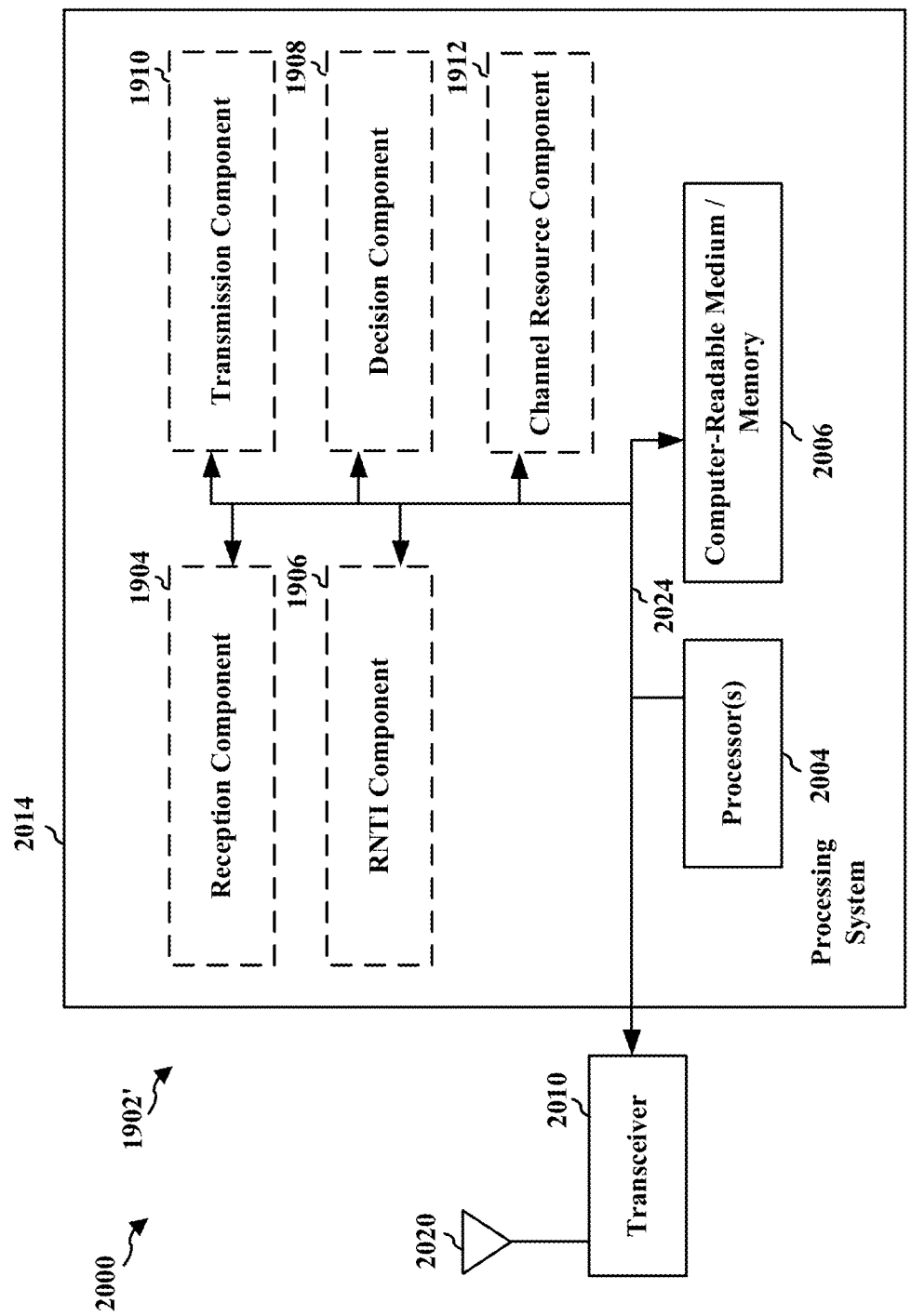
FIG. 20 is a diagram illustrating an example of a hardware implementation for an apparatus 1902' employing a processing system.

FIG. 20 is a diagram 2000 illustrating an example of a hardware implementation for an apparatus 1902' employing a processing system 2014. The apparatus 1902' may be a UE. The processing system 2014 may be implemented with a bus architecture, represented generally by a bus 2024. The bus 2024 may include any number of interconnecting buses and bridges depending on the specific application of the processing system 2014 and the overall design constraints. The bus 2024 links together various circuits including one or more processors and/or hardware components, represented by one or more processors 2004, the reception component 1904, the RNTI component 1906, the decision component 1908, the transmission component 1910, the channel resource component 1912, and a computer-readable medium/memory 2006. The bus 2024 may also link various other circuits such as timing sources, peripherals, voltage regulators, and power management circuits, etc.

The processing system 2014 may be coupled to a transceiver 2010, which may be one or more of the transceivers 254. The transceiver 2010 is coupled to one or more antennas 2020, which may be the communication antennas 252.

The transceiver 2010 provides a means for communicating with various other apparatus over a transmission medium. The transceiver 2010 receives a signal from the one or more antennas 2020, extracts information from the received signal, and provides the extracted information to the processing system 2014, specifically the reception component 1904. In addition, the transceiver 2010 receives information from the processing system 2014, specifically the transmission component 1910, and based on the received information, generates a signal to be applied to the one or more antennas 2020.

The processing system 2014 includes one or more processors 2004 coupled to a computer-readable medium/memory 2006. The one or more processors 2004 are responsible for general processing, including the execution of software stored on the computer-readable medium/memory 2006. The software, when executed by the one or more processors 2004, causes the processing system 2014 to perform the various functions described supra for any particular apparatus. The computer-readable medium/memory 2006 may also be used for storing data that is manipulated by the one or more processors 2004 when executing software. The processing system 2014 further includes at least one of the reception component 1904, the RNTI component 1906, the decision component 1908, the transmission component 1910, and the channel resource component 1912. The components may be software components running in the one or more processors 2004, resident/stored in the computer readable medium/memory 2006, one or more hardware components coupled to the one or more processors 2004, or some combination thereof. The processing system 2014 may be a component of the UE 250 and may include the memory 260 and/or at least one of the TX processor 268, the RX processor 256, and the communication processor 259.

In one configuration, the apparatus 1902/apparatus 1902' for wireless communication includes means for performing each of the operations of FIGS. 14-18. The aforementioned means may be one or more of the aforementioned components of the apparatus 1902 and/or the processing system 2014 of the apparatus 1902' configured to perform the functions recited by the aforementioned means.

As described supra, the processing system 2014 may include the TX Processor 268, the RX Processor 256, and the communication processor 259. As such, in one configuration, the aforementioned means may be the TX Processor 268, the RX Processor 256, and the communication processor 259 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
 determining resources of a first physical downlink shared channel (PDSCH) and resources of second at least one PDSCH on a cell, the first PDSCH being a unicast PDSCH specific to the UE;
determining that the first PDSCH overlaps with the second at least one PDSCH in a time domain;
determining whether the second at least one PDSCH is another unicast PDSCH specific to the UE; and
when the second at least one PDSCH is not another unicast PDSCH specific to the UE, a duration required for decoding the first PDSCH meets a duration threshold, and the cell is in a first frequency range:
(a) refraining from decoding the first PDSCH independently of a transport block size of the second at least one PDSCH or (b) determining a transport block size of the second at least one PDSCH.

2. The method of claim 1, further comprising:
determining that the first PDSCH is a PDSCH scheduled with a cell radio network temporary identifier (C-RNTI) or a configured scheduled radio network temporary identifier (CS-RNTI).

3. The method of claim 2, wherein the determining that the first PDSCH is a PDSCH scheduled with a C-RNTI or a CS-RNTI includes:
detecting a physical downlink control channel (PDCCH);
determining that the PDCCH is scrambled with the C-RNTI or the CS-RNTI; and
determining that the PDCCH indicating the first PDSCH.

4. The method of claim 1, further comprising:
determining that the second at least one PDSCH is scheduled with a paging radio network temporary identifier (P-RNTI), a system information radio network temporary identifier (SI-RNTI), or a random access radio network temporary identifier (RA-RNTI), wherein the second at least one PDSCH is determined not to be another unicast PDSCH specific to the UE.

5. The method of claim 4, wherein the determining that the second at least one PDSCH is scheduled with the P-RNTI, the SI-RNTI, or the RA-RNTI includes:
detecting a PDCCH;
determining that the PDCCH is scrambled with the P-RNTI, the SI-RNTI, or the RA-RNTI; and
determining that the PDCCH indicating the second at least one PDSCH.

6. The method of claim 4, wherein the decoding the first PDSCH is refrained from independently of a transport block size of the second at least one PDSCH.

7. The method of claim 4, further comprising:
determining that the transport block size of the second at least one PDSCH is greater than a threshold; and
refraining from decoding the first PDSCH.

8. The method of claim 4, wherein the second at least one PDSCH includes three PDSCHs, the method further comprising:
determining that a respective transport block size of each of the three PDSCHs is equal to or smaller than a threshold, wherein the determining that the first PDSCH overlaps with the second at least one PDSCH in the time domain includes determining that the three PDSCHs all occupy a same symbol period; and
refraining from decoding the first PDSCH.

9. The method of claim 1, further comprising:
when the second at least one PDSCH is another unicast PDSCH specific to the UE, refraining from decoding the first PDSCH, wherein the second at least one PDSCH has a priority level higher than that of the first PDSCH.

10. The method of claim 9, wherein the second at least one PDSCH is scheduled with a C-RNTI or a CS-RNTI.

11. The method of claim 1, further comprising:
transmitting a hybrid automatic repeat request (HARD) acknowledgment associated with the first PDSCH.

12. The method of claim 1, wherein the second at least one PDSCH is not another unicast PDSCH specific to the UE, wherein the cell is in the first frequency range, the method further comprising:
determining that the first PDSCH is a PDSCH scheduled with a cell radio network temporary identifier (C-RNTI), a Modulation Coding Scheme Cell RNTI (MCS-C-RNTI), or a configured scheduled radio network temporary identifier (CS-RNTI);
determining that the second at least one PDSCH is scheduled with a system information radio network temporary identifier (SI-RNTI);
determining that the duration required for decoding the first PDSCH does not meet the duration threshold; and
decoding the first PDSCH and the second PDSCH.

13. The method of claim 1, wherein the second at least one PDSCH is not another unicast PDSCH specific to the UE, wherein the cell is in the first frequency range, the method further comprising:
determining that the first PDSCH is a PDSCH scheduled with a cell radio network temporary identifier (C-RNTI), a Modulation Coding Scheme Cell RNTI (MCS-C-RNTI), or a configured scheduled radio network temporary identifier (CS-RNTI);
determining that the second at least one PDSCH is scheduled with a system information radio network temporary identifier (SI-RNTI); and
determining that the duration required for decoding the first PDSCH meets the duration threshold, wherein the decoding the first PDSCH is refrained from independently of a transport block size of the second at least one PDSCH.

14. The method of claim 1, wherein the second at least one PDSCH is not another unicast PDSCH specific to the UE, wherein the cell is not in the first frequency range and is in a second frequency range, the method further comprising:
determining that the first PDSCH is a PDSCH scheduled with a cell radio network temporary identifier (C-RNTI), a Modulation Coding Scheme Cell RNTI (MCS-C-RNTI), or a configured scheduled radio network temporary identifier (CS-RNTI);
determining that the second at least one PDSCH is scheduled with a system information radio network temporary identifier (SI-RNTI); and
refraining from decoding the first PDSCH independently of a transport block size of the second at least one PDSCH.

15. An apparatus for wireless communication, the apparatus being a user equipment (UE), comprising:
a memory; and
at least one processor coupled to the memory and configured to:
determine resources of a first physical downlink shared channel (PDSCH) and resources of second at least one PDSCH on a cell, the first PDSCH being a unicast PDSCH specific to the UE;
determine that the first PDSCH overlaps with the second at least one PDSCH in a time domain;
determine whether the second at least one PDSCH is another unicast PDSCH specific to the UE; and
when the second at least one PDSCH is not another unicast PDSCH specific to the UE, a duration required for decoding the first PDSCH meets a duration threshold, and the cell is in a first frequency range:

(a) refrain from decoding the first PDSCH independently of a transport block size of the second at least one PDSCH or (b) determine a transport block size of the second at least one PDSCH.

16. The apparatus of claim 15, wherein the at least one processor is further configured to:
determine that the first PDSCH is a PDSCH scheduled with a cell radio network temporary identifier (C-RNTI) or a configured scheduled radio network temporary identifier (CS-RNTI).

17. The apparatus of claim 15, wherein the at least one processor is further configured to:
determine that the second at least one PDSCH is scheduled with a paging radio network temporary identifier (P-RNTI), a system information radio network temporary identifier (SI-RNTI), or a random access radio network temporary identifier (RA-RNTI), wherein the second at least one PDSCH is determined not to be another unicast PDSCH specific to the UE.

18. The apparatus of claim 17, wherein the at least one processor is further configured to refrain from decoding the first PDSCH independently of a transport block size of the second at least one PDSCH.

19. The apparatus of claim 17, wherein the at least one processor is further configured to:
determine that the transport block size of the second at least one PDSCH is greater than a threshold; and
refrain from decoding the first PDSCH.

20. A non-transitory computer-readable medium storing computer executable code for wireless communication of wireless equipment, comprising code to:
determine resources of a first physical downlink shared channel (PDSCH) and resources of second at least one PDSCH on a cell, the first PDSCH being a unicast PDSCH specific to the UE;
determine that the first PDSCH overlaps with the second at least one PDSCH in a time domain;
determine whether the second at least one PDSCH is another unicast PDSCH specific to the UE; and
determine resources of a first physical downlink shared channel (PDSCH) and resources of second at least one PDSCH on a cell, the first PDSCH being a unicast PDSCH specific to the UE;
determine that the first PDSCH overlaps with the second at least one PDSCH in a time domain;
determine whether the second at least one PDSCH is another unicast PDSCH specific to the UE; and
when the second at least one PDSCH is not another unicast PDSCH specific to the UE, a duration required for decoding the first PDSCH meets a duration threshold, and the cell is in a first frequency range:
(a) refrain from decoding the first PDSCH independently of a transport block size of the second at least one PDSCH or (b) determine a transport block size of the second at least one PDSCH.

* * * * *